US009032323B2

(12) United States Patent
Park et al.

(10) Patent No.: US 9,032,323 B2
(45) Date of Patent: May 12, 2015

(54) CHARACTER INFORMATION DISPLAY DEVICE AND CHARACTER INFORMATION DISPLAY METHOD

(75) Inventors: Shinyoung Park, Tokyo (JP); Junichi Kimura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 294 days.

(21) Appl. No.: 13/824,319

(22) PCT Filed: Oct. 5, 2011

(86) PCT No.: PCT/JP2011/005613

§ 371 (c)(1), (2), (4) Date: Mar. 15, 2013

(87) PCT Pub. No.: WO2012/046446

PCT Pub. Date: Apr. 12, 2012

(65) Prior Publication Data

US 2013/0179822 A1 Jul. 11, 2013

(30) Foreign Application Priority Data

Oct. 6, 2010 (JP) ................................ 2010-226736

(51) Int. Cl.

*G06F 3/01* (2006.01)
*G09G 5/22* (2006.01)
*G09G 5/34* (2006.01)

(52) U.S. Cl.

CPC *G06F 3/01* (2013.01); *G09G 5/225* (2013.01); *G09G 5/343* (2013.01); *H04M 2242/12* (2013.01)

(58) Field of Classification Search

CPC .......................... G06F 3/048; H04M 1/72566
USPC ........................................................ 715/774
See application file for complete search history.

(56) References Cited

U.S. PATENT DOCUMENTS

2006/0242595 A1 10/2006 Kizumi
2012/0212407 A1* 8/2012 Tanaka .......................... 345/156
2012/0256967 A1* 10/2012 Baldwin et al. ............... 345/684

FOREIGN PATENT DOCUMENTS

JP 5-323941 A 12/1993
JP 6-161427 A 6/1994

(Continued)

OTHER PUBLICATIONS

NTTdatabase series Nihongo-no Goitokusei (Lexical Properties of Japanese) first edition, complied by NTT Communication Science Liboratories p. 172-p. 173.

*Primary Examiner* — Boris Pesin
*Assistant Examiner* — Angie Badawi
(74) *Attorney, Agent, or Firm* — Birch, Stewart, Kolasch & Birch, LLP

(57) ABSTRACT

A character information display device includes: a display format deciding part 2 for deciding that the display format of a character string to be displayed is telop display when the number of characters making up the character string exceeds the number of characters for one line on the screen; a scroll speed setting part 6 for setting the scroll speed of the character string to be displayed at a reference speed in a case where the character string is judged as a character string easy to read, and setting the scroll speed of the character string to be displayed at a slower speed than the reference speed in a case where the character string is judged as a character string difficult to read by a reading difficulty judging part 4; and so on.

17 Claims, 21 Drawing Sheets

(56) References Cited

FOREIGN PATENT DOCUMENTS

| | | | |
|---|---|---|---|
| JP | 08-287270 | A | 11/1996 |
| JP | 2004-264990 | A | 9/2004 |
| JP | 2005-17651 | A | 1/2005 |
| JP | 2005-92734 | A | 4/2005 |
| JP | 2005-107483 | A | 4/2005 |
| JP | 2006-126503 | A | 5/2006 |
| JP | 2008-76521 | A | 4/2008 |
| JP | 2008-90313 | A | 4/2008 |
| JP | 2008-170544 | A | 7/2008 |
| WO | WO 2004/079709 | A1 | 9/2004 |

* cited by examiner

FIG.11

| Japanese Graphic Character Code | JIS Code | SJIS Code | Character | Type | Familiarity |
|---|---|---|---|---|---|
| 3440 | 4248 | 91C6 | 柁 | 8 | 2.54 |
| 3441 | 4249 | 91C7 | 舵 | 8 | 4.17 |
| 3442 | 424A | 91C8 | 楕 | 8 | 3.25 |
| 3443 | 424B | 91C9 | 陀 | 8 | 4.25 |
| 3444 | 424C | 91CA | 駄 | 7 | 5.29 |
| 3445 | 424D | 91CB | 騨 | 8 | 3.29 |
| 3446 | 424E | 91CC | 体 | 2 | 6.67 |
| 3447 | 424F | 91CD | 堆 | 8 | 4.21 |
| 3448 | 4250 | 91CE | 対 | 3 | 6.42 |
| 3449 | 4251 | 91CF | 耐 | 7 | 5.58 |
| 3450 | 4252 | 91D0 | 岱 | 8 | 2.17 |
| 3451 | 4253 | 91D1 | 帯 | 4 | 6.04 |
| 3452 | 4254 | 91D2 | 待 | 3 | 6.17 |
| 3453 | 4255 | 91D3 | 怠 | 7 | 5.54 |
| 3454 | 4256 | 91D4 | 態 | 5 | 5.83 |
| 3455 | 4257 | 91D5 | 戴 | 8 | 4.50 |
| 3456 | 4258 | 91D6 | 替 | 7 | 5.79 |
| 3457 | 4259 | 91D7 | 泰 | 7 | 5.42 |
| 3458 | 425A | 91D8 | 滞 | 7 | 5.58 |
| 3459 | 425B | 91D9 | 胎 | 7 | 5.42 |

FIG.12

Examples of Digraph (Korean)

Examples of Fortis (Korean)

(a) 우카끼 까츠시케

(b) 우까끼 카츠시케

These Portions are Fortes

FIG.14

Example of Combined Display
(Kanji and Hiragana in Japanese)

Example of Combined Display
(Korean and Chinese)

Kotake-Mukaihara

Kotake-
Mukaihara

FIG.28
FIG.29
WARNING
Please hold on.
WARNING
Please hold on.

CHARACTER INFORMATION DISPLAY DEVICE AND CHARACTER INFORMATION DISPLAY METHOD

TECHNICAL FIELD

The present invention relates to a character information display device and a character information display method that telop-display character strings indicating train operation information, shopping information, and the like on, for example, an information board in a train, a bulletin board in a station or a shopping mall, and the like.

BACKGROUND ART

In the following Patent Document 1, there is disclosed a character information display device for setting a scroll speed of a character string to be displayed, and telop-displaying the character string at the scroll speed.

Namely, the character information display device has a data analysis part for, upon receiving display data, analyzing the display data, and determining the number of characters making up the character string to be displayed, and a main control part determines the scroll speed of the character string based on the analysis result of the data analysis unit, and outputs an instruction of telop-displaying the character string at the scroll speed to a display control unit.

However, the character information display device always telop-displays a character string irrespective of the length of the character string to be displayed.

For this reason, even when the number of characters making up the character string to be displayed is small, and it is possible to display all the characters on a screen at the same time, it is assumed that the character string is telop-displayed.

Also in the following Patent Documents 2 and 3, as in the above Patent Document 1, there is disclosed a character information display device for determining a scroll speed of a character string in consideration of superficial attributes such as the number of characters and colors of the characters. However, the scroll speed of the character string is not determined in consideration of profound attributes of the characters (e.g., familiarity of characters (index indicating a degree of approachability to characters) and complexity).

It is considered that visibility of the character is often affected not only by superficial aspects of the character but also by profound aspects of the character.

For this reason, for example, even if the number of characters making up the character string is small, it is difficult to read the character string in the case where characters that are lower in familiarity are included therein. Accordingly, a lot of time may be required for reading thereof.

PRIOR ART DOCUMENTS

Patent Documents

Patent Document 1: Japanese Patent Application Laid-open No. H6-161427 (paragraph numbers [0007] and [0008])

Patent Document 2: Japanese Patent Application Laid-open No. 2008-170544 (paragraph numbers [0006] and [0007])

Patent Document 3: Japanese Patent Application Laid-open No. 2008-76521 (paragraph number [0015])

SUMMARY OF THE INVENTION

Problems to be Solved by the Invention

Since the conventional character information display device is configured as mentioned above, it is not limited to a case where the number of characters making up the character string to be displayed is large, and all the characters cannot be displayed unless telop-displayed; thus, even when the number of characters making up the character string to be displayed is small, and all the characters can be displayed on a screen at the same time, the character string is telop-displayed. This poses a problem that the character string is not always displayed in a high-visibility display format.

Further, the scroll speed of the character string is not determined in consideration of the profound attributes of the characters (e.g., familiarity and complexity of the characters). This poses a problem that the scroll speed is not determined to a proper scroll speed commensurate with the difficulty in reading the character string.

The present invention is made in order to solve the foregoing problems. An object of the invention is to provide a character information display device and a character information display method capable of determining a proper display format and a scroll speed for every character string to be displayed, and implementing a high-visibility character string display.

Means for Solving the Problems

A character information display device in accordance with the invention is provided with: a display format deciding unit for deciding that, based on a length of a character string to be displayed, a display format of the character string to be displayed is telop display or full text simultaneous display; a character attribute determining unit for determining attributes of characters making up the character string to be displayed; a reading difficulty judging unit for judging whether the character string to be displayed is a character string easy to read or a character string difficult to read, based on the attributes of the characters determined by the character attribute determining unit; and a scroll speed setting unit for, when the display format deciding unit decides that the display format of the character string is telop display, setting a scroll speed of the character string to be displayed at a reference speed in a case where the character string is judged as a character string easy to read by the reading difficulty judging unit, and setting the scroll speed of the character string to be displayed at a slower speed than the reference speed in a case where the character string is judged as a character string difficult to read by the reading difficulty judging unit; and a character string display unit for, when decision is made by the display format deciding unit that the display format of the character string is telop display telop-displaying the character string to be displayed at the scroll speed set by the scroll speed setting unit, and when decision is made by the display format deciding unit that the display format of the character string is full text simultaneous display simultaneously displaying all the characters making up the character string to be displayed on a screen, wherein when the characters making up the character string to be displayed are ideographic characters, the character attribute determining unit identifies a difficulty indicative of the degree of difficulty in pronunciation of the character string as the attribute of the characters, and the reading difficulty judging unit judges the character string to be displayed as a character string easy to read in a case where the difficulty identified by the character attribute determining unit is lower than a prescribed difficulty, and judges the character string to be displayed as a character string difficult to read in a case where the difficulty identified by the character attribute determining unit is higher than the prescribed difficulty.

Effect of the Invention

In accordance with the invention, there are disposed a display format deciding unit for deciding that, based on a length of a character string to be displayed, a display format of the character string to be displayed is telop display or full text simultaneous display; a character attribute determining unit for determining attributes of characters making up the character string to be displayed; a reading difficulty judging unit for judging whether the character string to be displayed is a character string easy to read or a character string difficult to read, based on the attributes of the characters determined by the character attribute determining unit; and a scroll speed setting unit for, when the display format of the character string is decided as telop display by the display format deciding unit, setting the scroll speed of the character string to be displayed at a reference speed if the character string to be displayed is judged as a character string easy to read by the reading difficulty judging unit, and setting the scroll speed of the character string to be displayed at a slower speed than the reference speed if the character string to be displayed is judged as a character string difficult to read by the reading difficulty judging unit; and a character string display unit for, when decision is made by the display format deciding unit that the display format of the character string is telop display, telop-displaying the character string to be displayed at the scroll speed set by the scroll speed setting unit, and when decision is made by the display format deciding unit decided that the display format of the character string is full text simultaneous display, simultaneously displaying all the characters making up the character string to be displayed on a screen, wherein when the characters making up the character string to be displayed are ideographic characters, the character attribute determining unit identifies a difficulty indicative of the degree of difficulty in pronunciation of the character string as the attribute of the characters, and the reading difficulty judging unit judges the character string to be displayed as a character string easy to read in a case where the difficulty identified by the character attribute determining unit is lower than a prescribed difficult and judges the character string to be displayed as a character string difficult to read in a case where the difficulty identified by the character attribute determining unit is higher than the prescribed difficulty. Accordingly, for every character string to be displayed, it is contemplated that a proper display format and a scroll speed are decided. As a result, there is an advantageous effect such that a high-visibility character string display can be implemented.

BRIEF DESCRIPTION OF THE DRAWINGS

FIG. 11 is an explanatory view showing examples of the familiarities of various characters in Japanese (kanji) and Chinese.

FIG. 12 is an explanatory view showing examples of digraphs in Korean.

FIGS. 13(*a*) and 13(*b*) are each an explanatory view showing an example of a fortes-containing Korean character string.

FIG. 14 is an explanatory view showing one example of combined display of Japanese (kanji) and Japanese (hiragana).

FIG. 15 is an explanatory view showing one example of combined display of Korean and Chinese.

FIG. 16 is an explanatory view showing examples of a display format of a character string in Roman alphabet when the number of the characters is equal to or larger than a threshold value N.

BEST MODE FOR CARRYING OUT THE INVENTION

In the following, in order to describe the present invention in more detail, embodiments for carrying out the invention will be described with reference to the accompanying drawings.

Embodiment 1

Figure 1:
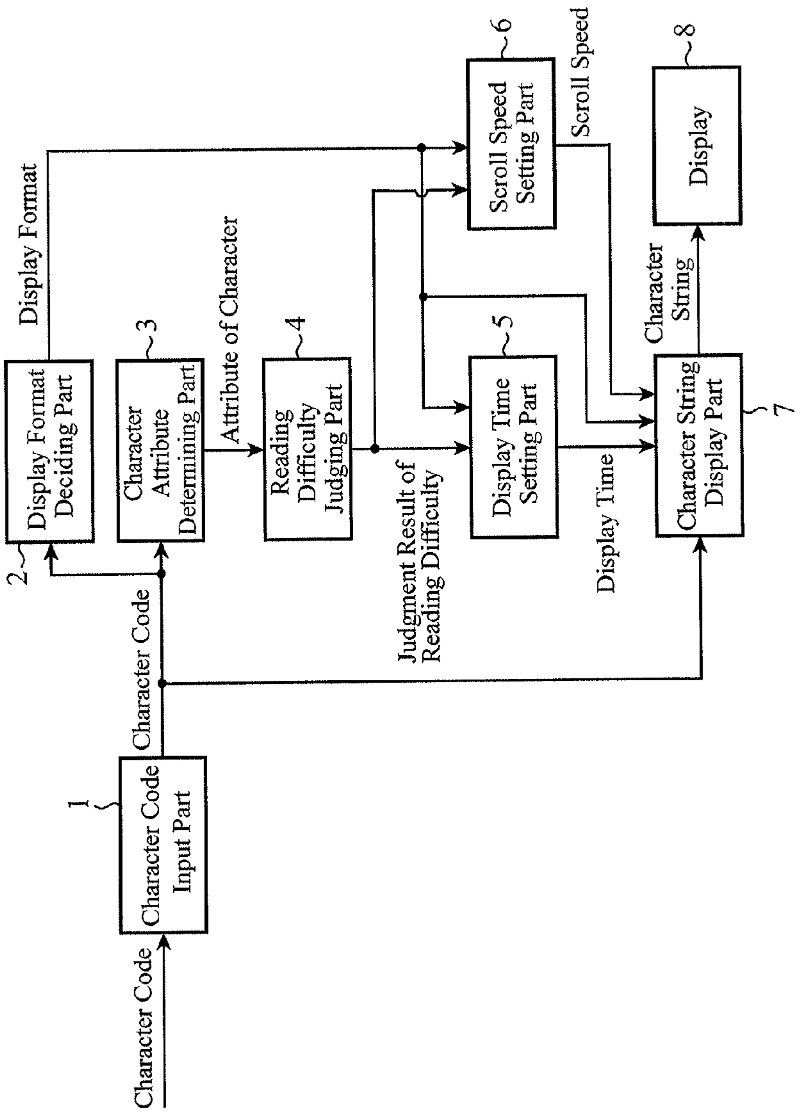
FIG. 1 is a block diagram showing a character information display device in accordance with Embodiment 1 of the present invention.

FIG. 1 is a block diagram showing a character information display device in accordance with Embodiment 1 of the present invention.

A description will be given to an example in which the character information display device of Embodiment 1 is applied to a device for displaying a character string indicating the next arrival station, the operation information, and so on in multilanguage on an information board in a train.

However, the character information display device is not limited to a device for displaying the character string on the information board in the train, and can be applied to any device (digital signage) for displaying character information in, for example, station, airport, store, street, campus, office, and so on.

In FIG. 1, a character code input part 1 is an interface for inputting the character code (for example, JIS code, Shift JIS code, EUC code, Unicode, and so on) of the characters making up the character string to be displayed.

For example, when the character information display device is connected to a network such as LAN or the Internet, the character code input part 1 is configured by a network interface device, and inputs a character code via the network.

Whereas, when the character code input part 1 is configured by a man-machine interface such as a keyboard or a mouse, a user operates the character code input part 1 to input a character code.

The display format deciding part 2 is configured by, for example, a CPU-mounting semiconductor integrated circuit or a one chip microcomputer, and identifies the number of characters making up the character string to be displayed (for example, a character string indicating the next arrival station or the train operation information) from the character codes inputted by the character code input part 1, and the following processing is performed: when the number of the characters exceeds the number of characters for one line on a screen (the number of characters for one line on the screen in a display 8), decision is made that the display format of the character string is telop display, whereas when the number of characters making up the character string to be displayed is equal to or smaller than the number of characters for one line on the screen, decision is made that the display format of the character string is full text simultaneous display (a format in which all the characters making up the character string to be displayed are simultaneously displayed on a screen). Incidentally, the display format deciding part 2 configures a display format deciding unit.

The character attribute determining part 3 is configured by, for example, the CPU-mounting semiconductor integrated circuit or one chip microcomputer, identifies the characters making up the character string to be displayed from the character codes inputted by the character code input part 1, and executes the processing of determining the attributes of the characters. Incidentally, the character attribute determining part 3 configures a character attribute determining unit.

The reading difficulty judging part 4 is configured by, for example, the CPU-mounting semiconductor integrated circuit or one chip microcomputer, and executes the processing of judging whether the character string to be displayed is a character string easy to read or a character string difficult to read in consideration of the attributes of the characters determined by the character attribute determining part 3. Incidentally, the reading difficulty judging part 4 configures a reading difficulty judging unit.

The display time setting part 5 is configured by, for example, the CPU-mounting semiconductor integrated circuit or one chip microcomputer, and executes the following processing: in the case where decision is made by the display format deciding part 2 that the display format of the character string is full text simultaneous display, if the character string is judged as a character string easy to read by the reading difficulty judging part 4, the display time of the character string to be displayed is set at a reference display time T1, and if the character string is judged as a character string difficult to read by the reading difficulty judging part 4, the display time of the character string to be displayed is set at a time T2 longer than the reference display time T1. Incidentally, the display time setting part 5 configures a display time setting unit.

The scroll speed setting part 6 is configured by, for example, the CPU-mounting semiconductor integrated circuit or one chip microcomputer, and executes the following processing: in the case where the display format of the character string is decided as telop display by the display format deciding part 2, if the character string is judged as a character string easy to read by the reading difficulty judging part 4, the scroll speed of the character string to be displayed is set at a reference speed V1, and if the character string is judged as a character string difficult to read by the reading difficulty judging part 4, the scroll speed of the character string to be displayed is set at a speed V2 slower than the reference speed V1. Incidentally, the scroll speed setting part 6 configures a scroll speed setting unit.

The character string display part 7 is configured by, for example, the CPU-mounting semiconductor integrated circuit or one chip microcomputer, and executes the following processing: in the case where the display format of the character string is decided as full text simultaneous display by the display format deciding part 2, during the display time set by the display time setting part 5, all the characters making up the character string to be displayed are simultaneously displayed on the screen of the display 8.

On the other hand, in the case where the display format of the character string is decided as telop display by the display format deciding part 2, there is executed the processing of telop-displaying the character string to be displayed on the screen of the display 8 at the scroll speed set by the scroll speed setting part 6.

The display 8 is, for example, an information board to be set in the vicinity of the top of the open/close door of a train, and displays a character string by the character string display part 7 thereon.

Incidentally, the character string display part 7 and the display 8 configure a character string display unit.

In FIG. 1, it is assumed that each of the character code input part 1, the display format deciding part 2, the character attribute determining part 3, the reading difficulty judging part 4, the display time setting part 5, the scroll speed setting part 6, the character string display part 7, and the display 8 which are components of the character information display device is configured by a special-purpose hardware. However, when the character information display device is configured by a computer, it may be configured as follows: a program describing the processing contents of the character code input part 1, the display format deciding part 2, the character attribute determining part 3, the reading difficulty judging part 4, the display time setting part 5, the scroll speed setting part 6, and the character string display part 7 is stored in a memory of a computer; thus, the CPU of the corresponding computer executes the program stored in the memory.

Figure 2:
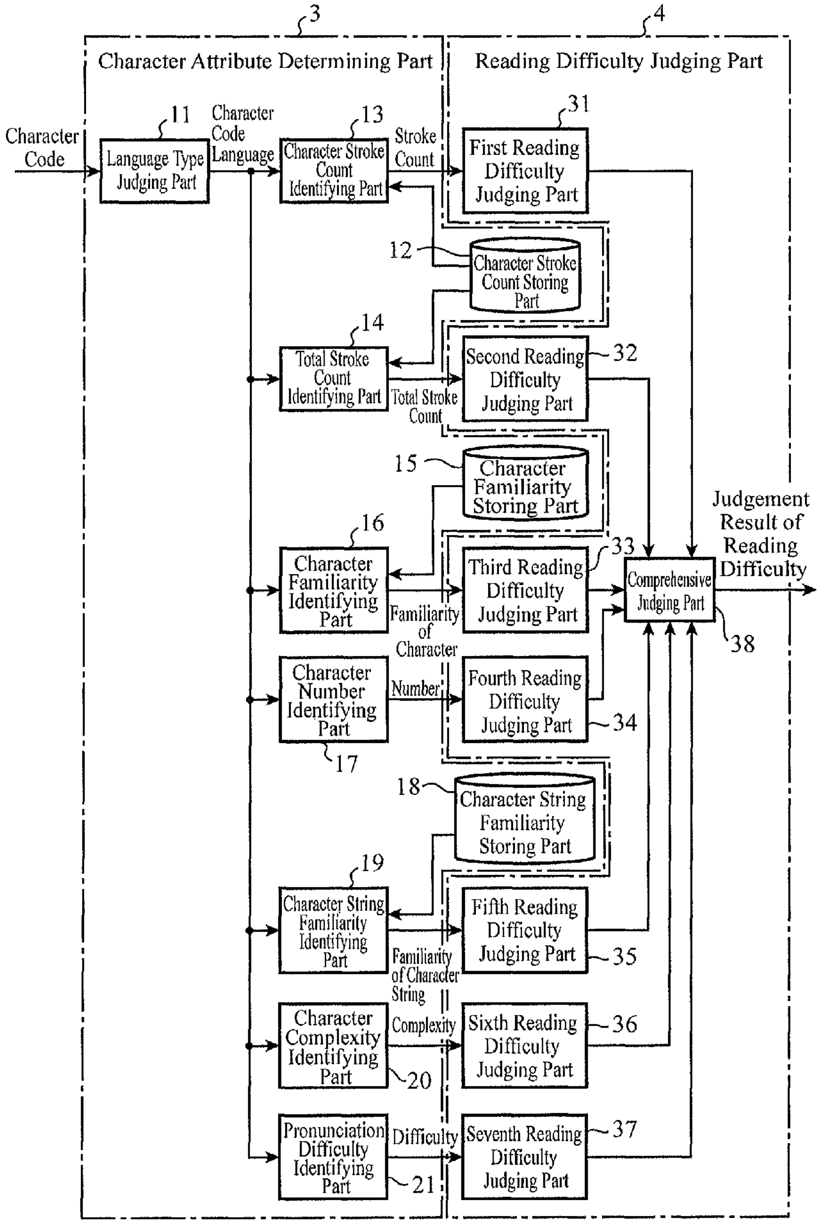
FIG. 2 is a block diagram showing a character attribute determining part 3 and a reading difficulty judging part 4 of the character information display device in accordance with Embodiment 1 of the invention.

FIG. 2 is a block diagram showing the character attribute determining part 3 and the reading difficulty judging part 4 of the character information display device in accordance with Embodiment 1 of the invention.

In FIG. 2, a language type judging part 11 executes the processing of determining the language of the characters making up the character string to be displayed with reference to the character codes inputted by the character code input part 1.

For example, when the character code falls within the range of AAAA to BBBB, the language of the characters is determined as Japanese (kanji); within the range of CCCC to DDDD, the language of the characters is determined as Japanese (hiragana); or within the range of EEEE to FFFF, the language of the characters is determined as Roman alphabet or English. However, in Embodiment 1, for convenience of description, within the range of EEEE to FFFF, the language of the characters is determined as Roman alphabet. Whereas, within the range of GGGG to HHHH, the language of the characters is determined as Korean; or within the range of IIII to JJJJ, the language of the characters is determined as Chinese.

A character stroke count storing part 12 is a data base recording stroke counts (the number of strokes) of various characters.

A character stroke count identifying part 13 executes, when the language of the character determined by the language type judging part 11 is Japanese (kanji) or Chinese (character being an ideographic character), the processing of identifying the stroke count of the character (attribute of characters) with reference to the character stroke count storing part 12.

A total stroke count identifying part 14 executes, when the language of the character determined by the language type judging part 11 is Japanese (kanji) or Chinese, the processing of identifying the total stroke count of all the characters making up the character string to be displayed (attribute of characters) with reference to the character stroke count storing part 12.

A character familiarity storing part 15 is a data base recording the familiarities of various characters (Japanese (kanji) and Chinese characters) (index indicating a degree of approachability with respect to characters).

When the language of the character determined by the language type judging part 11 is Japanese (kanji) or Chinese, a character familiarity identifying part 16 executes the processing of identifying the familiarity of the character with reference to the character familiarity storing part 15.

When the language of the characters determined by the language type judging part 11 is Japanese (hiragana: character being phonetic characters), a character number identifying part 17 executes the processing of identifying the number of characters making up the character string to be displayed.

A character string familiarity storing part 18 is a database recording the familiarities of various character strings (the character strings made up by Japanese (hiragana)).

When the language of the characters determined by the language type judging part 11 is Japanese (hiragana), a character string familiarity identifying part 19 executes the processing of identifying the familiarity of the character string to be displayed with reference to the character string familiarity storing part 18.

When the language of the characters determined by the language type judging part 11 is English or Korean, a character complexity identifying part 20 executes the processing of identifying the visual complexity with respect to the character string to be displayed as the attribute of the character.

When the language of the characters determined by the language type judging part 11 is Korean, a pronunciation difficulty identifying part 21 executes the processing of identifying the difficulty in pronunciation of the character string to be displayed (index indicating the degree of difficulty in pronunciation with respect to the character string) as the attribute of the characters.

A first reading difficulty judging part 31 judges the character string to be displayed as a character string easy to read, unless the characters making up the character string to be displayed include therein a character whose stroke count identified by the character stroke count identifying part 13 exceeds a threshold value P (e.g., P=15), and judges the character string to be displayed as a character string difficult to read, if the characters making up the character string to be displayed include therein a character whose stroke count identified by the character stroke count identifying part 13 exceeds the threshold value P.

A second reading difficulty judging part 32 judges the character string to be displayed as a character string easy to read, unless the total stroke count identified by the total stroke count identifying part 14 exceeds a threshold value M (e.g., M=35), and judges the character string to be displayed as a character string difficult to read, if the total stroke count identified by the total stroke count identifying part 14 exceeds the threshold value M.

A third reading difficulty judging part 33 judges the character string to be displayed as a character string easy to read, unless the characters making up the character string to be displayed include therein a character whose familiarity identified by the character familiarity identifying part 16 is lower than a threshold value S1, and judges the character string to be displayed as a character string difficult to read, if the characters making up the character string to be displayed include therein a character whose familiarity identified by the character familiarity identifying part 16 is lower than the threshold value S1.

A fourth reading difficulty judging part 34 judges the character string to be displayed as a character string easy to read, if the number identified by the character number identifying part 17 is smaller than a threshold value N (e.g., N=8 for hiragana, N=15 for Roman alphabet, or N=8 for Korean), and judges the character string to be displayed as a character string difficult to read, if the number identified by the character number identifying part 17 is equal to or larger than the threshold value N.

A fifth reading difficulty judging part 35 judges the character string to be displayed as a character string easy to read, if the familiarity identified by the character string familiarity identifying part 19 is equal to or larger than a threshold value S2, and judges the character string to be displayed as a character string difficult to read, if the familiarity identified by the character string familiarity identifying part 19 is lower than the threshold value S2.

A sixth reading difficulty judging part 36 judges the character string to be displayed as a character string easy to read, if the visual complexity identified by the character complexity identifying part 20 is lower than a threshold value C, and judges the character string to be displayed as a character string difficult to read, if the visual complexity identified by the character complexity identifying part 20 is equal to or larger than the threshold value C.

A seventh reading difficulty judging part 37 judges the character string to be displayed as a character string easy to read, if the difficulty in pronunciation identified by the pronunciation difficulty identifying part 21 is lower than a threshold value D, and judges the character string to be displayed as a character string difficult to read, if the difficulty in pronunciation identified by the pronunciation difficulty identifying part 21 is equal to or larger than the threshold value D.

However, the first to seventh reading difficulty judging parts 31 to 37 execute the judgment processing as long as the character code of the character of the self-applicable language is inputted, and do not execute the judgment processing when the character code of the character of the inapplicable language is inputted.

For example, the first reading difficulty judging part 31 executes the judgment processing, if the language of the characters determined by the language type judging part 11 is Japanese (kanji) or Chinese, but or does not execute the judgment processing, if the language of the characters is Japanese (hiragana), the Roman alphabet, or Korean.

A comprehensive judging part 38 finally judges the character string to be displayed as a character string easy to read, if all the judgment results of the reading difficulty judging parts in which the judgment processing is executed, out of the first to seventh reading difficulty judging parts 31 to 37, indicate to the effect that the character string to be displayed is a character string easy to read. On the other hand, if the judgment result of at least one of the reading difficulty judging parts indicates to the effect that the character string to be displayed is a character string difficult to read, the part 38 finally judges the character string to be displayed as a character string difficult to read.

Figure 3:
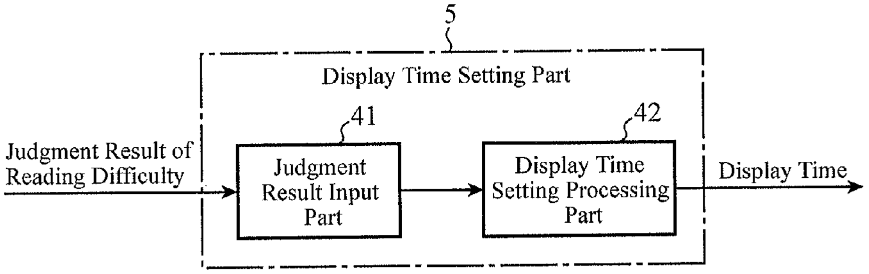
FIG. 3 is a block diagram showing a display time setting part 5 of the character information display device in accordance with Embodiment 1 of the invention.

FIG. 3 is a block diagram showing the display time setting part 5 of the character information display device in accordance with Embodiment 1 of the invention.

In FIG. 3, a judgment result input part 41 executes the processing of inputting the final judgment result of the comprehensive judging part 38 in the reading difficulty judging part 4.

A display time setting processing part 42 executes the processing of, if the judgment result inputted by the judgment result input part 41 indicates to the effect that the character string to be displayed is a character string easy to read, setting the display time of the character string to be displayed at a reference display time T1 (e.g., 2 seconds), and if the judgment result inputted by the judgment result input part 41 indicates to the effect that the character string to be displayed is a character string difficult to read, setting the display time of the character string to be displayed at a display time T2 twice the reference display time T1.

Here, there is shown the example in which the display time is set at the display time T2 twice the reference display time T1. However, the display time is not necessarily limited to the display time T2 twice the reference display T1 so long as it is a longer display time than the reference display time T1.

Figure 4:
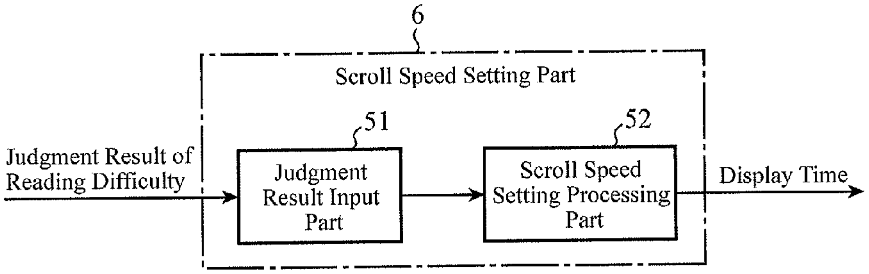
FIG. 4 is a block diagram showing a scroll speed setting part 6 of the character information display device in accordance with Embodiment 1 of the invention.

FIG. 4 is a block diagram showing the scroll speed setting part 6 of the character information display device in accordance with Embodiment 1 of the invention.

In FIG. 4, a judgment result input part 51 executes the processing of inputting the final judgment result of the comprehensive judging part 38 in the reading difficulty judging part 4.

A scroll speed setting processing part 52 executes the processing of, if the judgment result inputted by the judgment result input part 51 indicates to the effect that the character string to be displayed is a character string easy to read, setting the scroll speed of the character string to be displayed at the reference speed V1 (e.g., 20 cm/sec), and if the judgment result inputted by the judgment result input part 51 indicates to the effect that the character string to be displayed is a character string difficult to read, setting the scroll speed of the character string to be displayed at the speed V2 half the reference speed V1.

Here, there is shown the example in which the scroll speed is set at the scroll speed V2 half the reference scroll speed V1; however, the scroll speed is not necessarily limited to the scroll speed V2 half the reference scroll speed V1 so long as it is the scroll speed V2 slower than the reference scroll speed V1.

Figure 5:
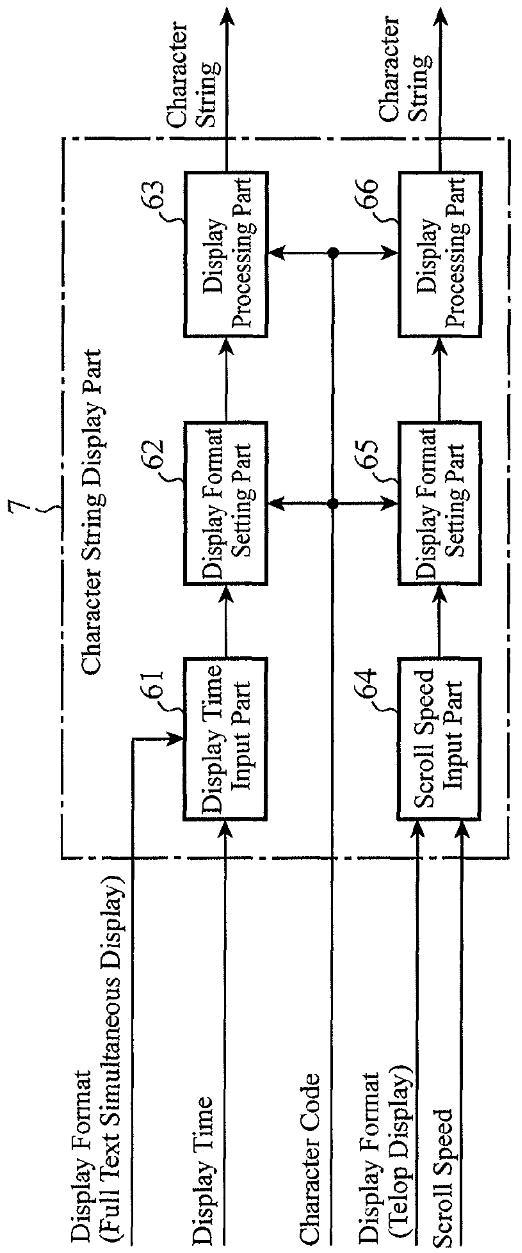
FIG. 5 is a block diagram showing a character string display part 7 of the character information display device in accordance with Embodiment 1 of the invention.

FIG. 5 is a block diagram showing the character string display part 7 of the character information display device in accordance with Embodiment 1 of the invention.

In FIG. 5, a display time input part 61 executes the processing of inputting the display time T1 or T2 set by the display time setting processing part 42 of the display time setting part 5, when the display format of the character string is decided as full text simultaneous display by the display format deciding part 2.

A display format setting part 62 adopts a display format in which the character strings in respective languages are in turn displayed, if the display times of the character strings in all languages are T1, and adopts a display format in which the character strings in some languages are put in combination, if the display times of the character strings in some languages are T2.

In the case where a display format in which the character strings in respective languages are in turn displayed is adopted by the display format setting part 62, a display processing part 63 executes the processing of simultaneously full-text displaying the character strings in respective languages in the order of, for example, Japanese (kanji), Japanese (hiragana), the Roman alphabet, Korean, and Chinese on the display 8 during the display time T1 for each of them.

On the other hand, when the display format in which the character strings in some languages are put in combination is adopted by the display format setting part 62, there is executed the following processing: for example, if the display time of Japanese (kanji) is T2, Japanese (kanji) and Japanese (hiragana) are put in combination, and if the display time of Korean is T2, Korean and Chinese are put in combination, and further the character strings in respective languages are simultaneously full-text displayed in the order of (Japanese (kanji)+Japanese (hiragana)), the Roman alphabet, and (Korean+Chinese) on the display 8.

In this case, the display times of (Japanese (kanji)+Japanese (hiragana)) and (Korean+Chinese) are set at T2, and the display time of the Roman alphabet is set at T1.

A scroll speed input part 64 executes the processing of inputting the scroll speed V1 or V2 set by the scroll speed setting processing part 52 of the scroll speed setting part 6, when the display format of the character string is decided as telop display by the display format deciding part 2.

A display format setting part 65 adopts the display format in which the character strings in respective languages are in turn displayed, if the scroll speeds of the character strings in all languages are V1, and adopts the display format in which the character strings in some languages are put in combination, if the scroll speeds of the character strings in some languages are V2.

In the case where the display format in which the character strings in respective languages are in turn displayed is adopted by the display format setting part 65, a display processing part 66 executes the processing of telop-displaying the character strings in respective languages in the order of, for example, Japanese (kanji), Japanese (hiragana), the Roman alphabet, Korean, and Chinese on the display 8 at the scroll speed V1.

On the other hand, when the display format in which the character strings in some languages are put in combination is adopted by the display format setting part 65, there is executed the following processing: for example, if the scroll speed of Japanese (kanji) is V2, Japanese (kanji) and Japanese (hiragana) are put in combination, and if the scroll speed of Korean is V2, Korean and Chinese are put in combination, and the character strings in respective languages are telop-displayed in the order of (Japanese (kanji)+Japanese (hiragana)), the Roman alphabet, and (Korean+Chinese) on the display 8.

In this case, the scroll speed of (Japanese (kanji)+Japanese (hiragana)) and (Korean+Chinese) is set at V2, and the scroll speed of the Roman alphabet is set at V1.

Figure 6:
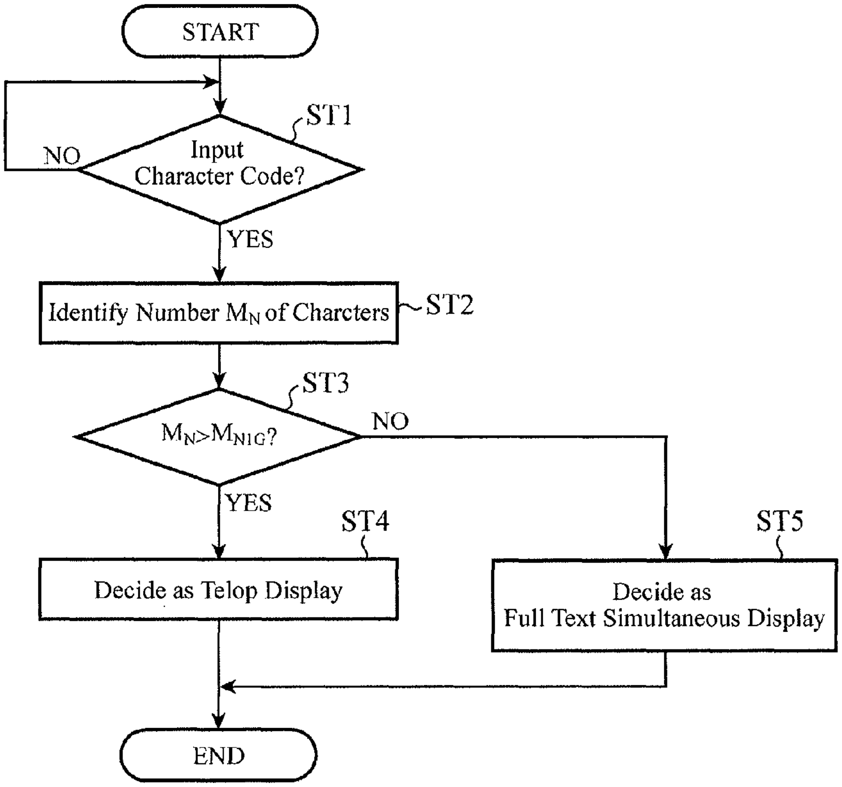
FIG. 6 is a flowchart showing the processing contents of a display format deciding part 2 of the character information display device in accordance with Embodiment 1 of the invention.

FIG. 6 is a flowchart showing the processing contents of the display format deciding part 2 of the character information display device in accordance with Embodiment 1 of the invention.

Figure 7:
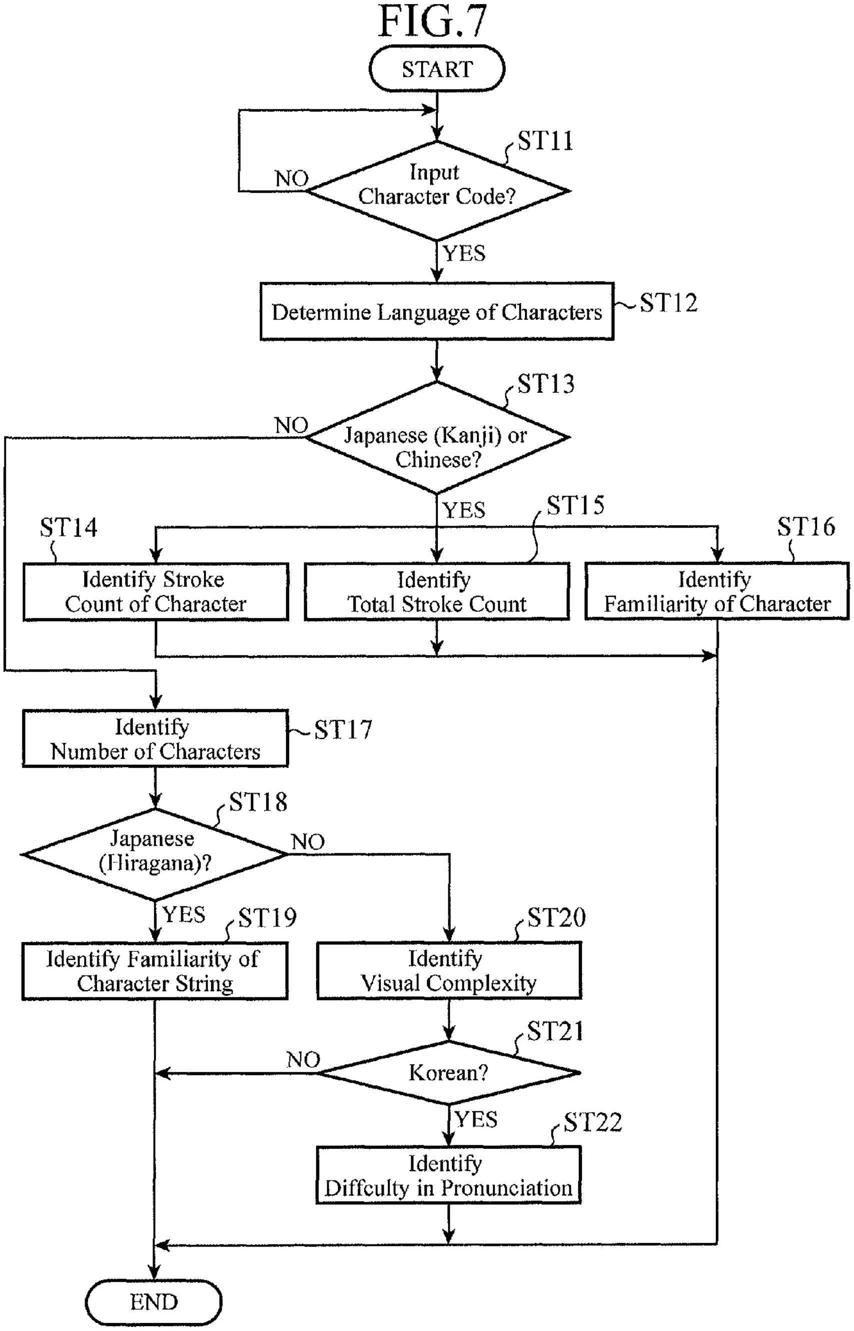
FIG. 7 is a flowchart showing the processing contents of the character attribute determining part 3 of the character information display device in accordance with Embodiment 1 of the invention.

FIG. 7 is a flowchart showing the processing contents of the character attribute determining part 3 of the character information display device in accordance with Embodiment 1 of the invention.

Figure 8:
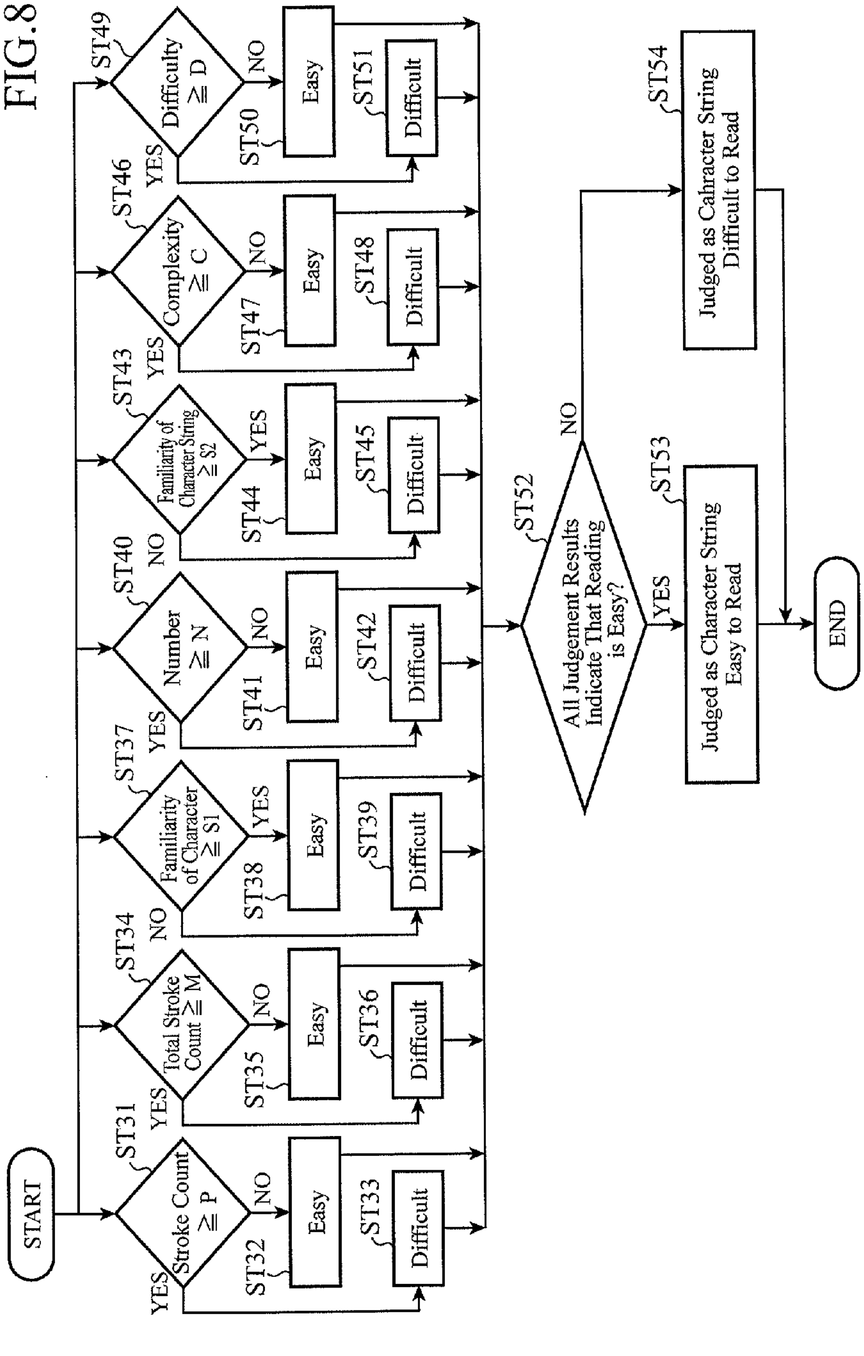
FIG. 8 is a flowchart showing the processing contents of the reading difficulty judging part 4 of the character information display device in accordance with Embodiment 1 of the invention.

FIG. 8 is a flowchart showing the processing contents of reading difficulty judging part 4 of the character information display device in accordance with Embodiment 1 of the invention.

Figure 9:
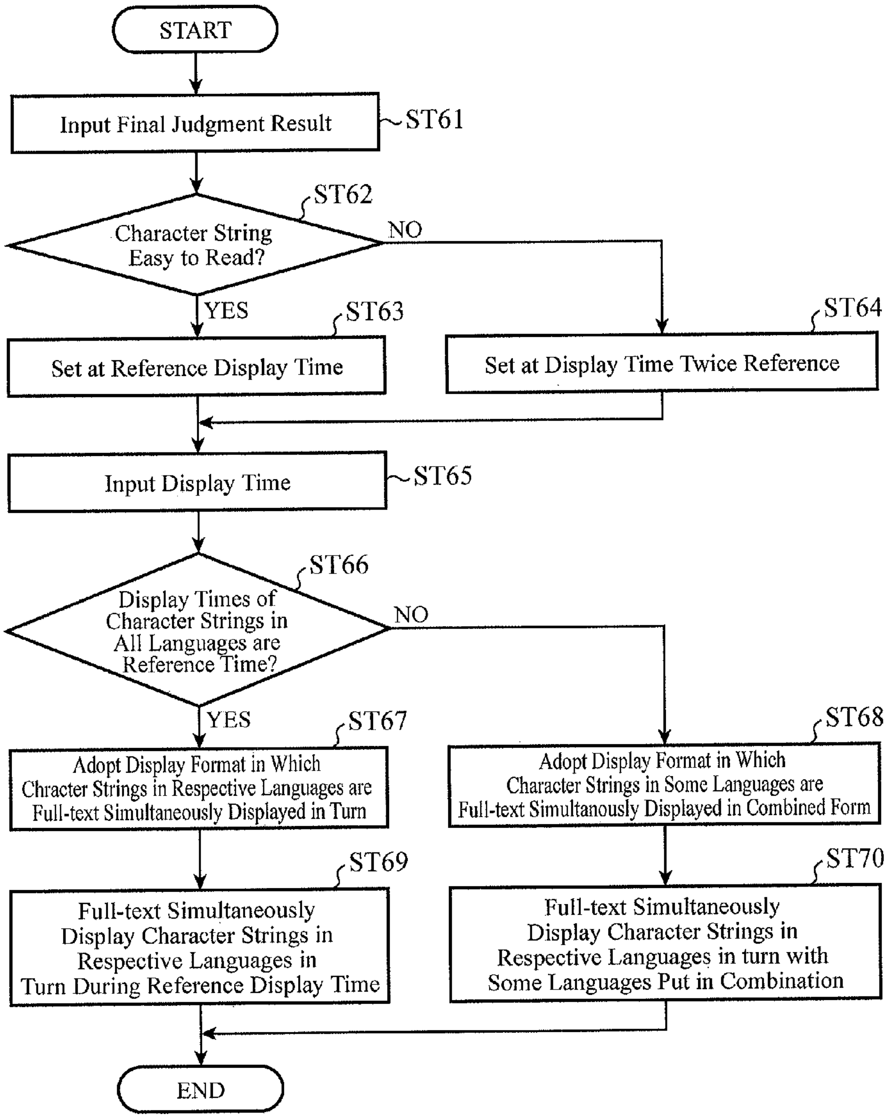
FIG. 9 is a flowchart showing the processing contents of the display time setting part 5 and the character string display part 7 of the character information display device in accordance with Embodiment 1 of the invention.

FIG. 9 is a flowchart showing the processing contents of the display time setting part 5 and the character string display part 7 of the character information display device 7 in accordance with Embodiment 1 of the invention.

Figure 10:
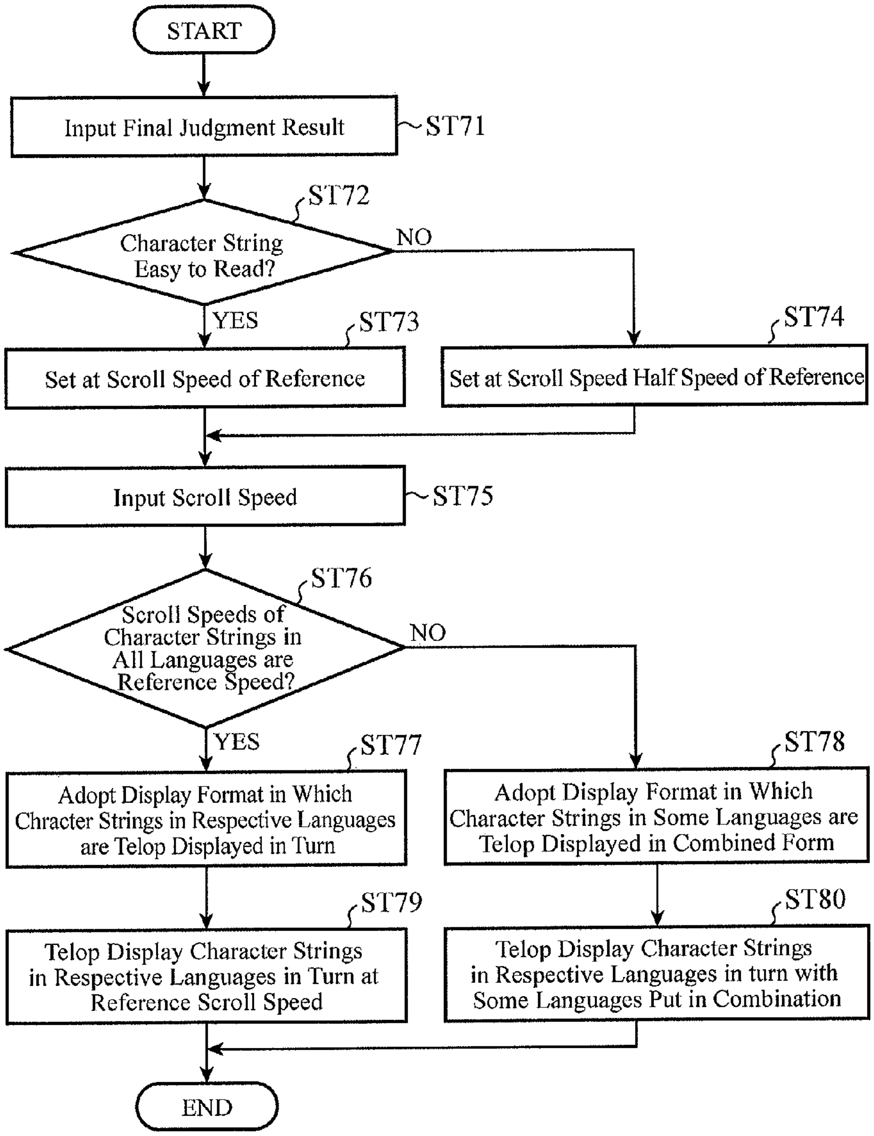
FIG. 10 is a flowchart showing the processing contents of the scroll speed setting part 6 and the character string display part 7 of the character information display device in accordance with Embodiment 1 of the invention.

FIG. 10 is a flowchart showing the processing contents of the scroll speed setting part 6 and the character string display part 7 of the character information display device in accordance with Embodiment 1 of the invention.

Next, an operation thereof will be described.

In the case where the character string indicating the next arrival station or the operation information, for instance, is inputted as the character string to be displayed, the character code input part 1 inputs the character code (for example, JIS code, Shift JIS code, EUC code, Unicode, and so on) of the characters making up the character string indicating the next arrival station or the operation information.

For example, when the next arrival station is the Tokyo station, and the next arrival station is displayed in multilanguage (for example, Japanese (kanji), Japanese (hiragana), the Roman alphabet, Korean, and Chinese), the character codes of the characters making up the character strings in respective languages are in turn inputted.

For example, when the language is Japanese (kanji), the character codes of "東" (To) and "京" (Kyo) are inputted. When the language is Japanese (hiragana), the character codes of "と" (To), "う" (U), "き" (Ki), "よ" (yo), and "う" (U) are inputted. When the language is the Roman alphabet, the character codes of "t", "o", "k", "y", and "o" are inputted.

When the display format deciding part 2 receives the character codes by the character code input part 1 (Step ST1 of FIG. 6), it identifies the number $M_N$ of characters making up the character string to be displayed (for example, the character string indicating the next arrival station or the character string indicating the operation information) from the character codes (Step ST2).

Namely, the display format deciding part 2 counts the number of the character codes inputted by the character code input part 1, and thereby identifies the number $M_N$ of the characters making up the character string.

For example, when the character string to be displayed is "とうきょう" (Tokyo), five character codes are inputted, and hence the number $M_N$ of characters of the character string is identified to be "5". When the character string to be displayed is "運行情報：午前7時頃東京駅構内で発生した人身事故の影響で運転を見合わせています。" (Operation information: the operation has been suspended under the influence of an accident resulting in injury or death that occurred in the Tokyo station yard at 7 a.m.), 40 character codes are inputted, and hence the number $M_N$ of characters of the character string is identified to be "40".

When the display format deciding part 2 identifies the number $M_N$ of characters making up the character string to be displayed, it compares the number of characters $M_N$ with the number $M_{N1G}$ (e.g., $M_{N1G}$=14) of characters according to one line on the screen in the display 8 (Step ST3).

When the number $M_N$ of the characters of the character string to be displayed exceeds the number $M_{N1G}$ of characters according to one line on the screen ($M_N > M_{N1G}$), the display format deciding part 2 decides the display format of the character string as telop display (Step ST4).

On the other hand, when the number $M_N$ of the characters of the character string to be displayed is equal to or smaller than the number $M_{N1G}$ of the characters according to one line on the screen ($M_N \leq M_{N1G}$), the display format of the character string is decided as full text simultaneous display (Step ST5).

In such a way, for example, when the character string to be displayed is "運行情報：午前7時頃東京駅構内で発生した人身事故の影響で運転を見合わせています。" (Operation information: the operation has been suspended under the influence of an accident resulting in injury or death that occurred in the Tokyo station yard at 7 a.m.), the display format of the character string is decided as telop display.

Also, when the character string to be displayed is "とうきょう" (Tokyo), the display format of the character string is decided as full text simultaneous display.

When the character attribute determining part 3 receives the character codes from the character code input part 1, it identifies the characters making up the character string to be displayed from the character codes, and determines the attributes of the characters (for example, stroke count of each character, total stroke count of all the characters, familiarity of each character, the number of the characters, familiarity of the character string, complexity of each character, and difficulty in pronunciation).

Hereinafter, the processing contents of the character attribute determining part 3 will be specifically described.

When the language type judging part 11 of the character attribute determining part 3 receives the character codes from the character code input part 1 (Step ST11 of FIG. 7), it determines the language of the characters making up the character string to be displayed with reference to the character codes (Step ST12).

For example, when the character code falls within the range of AAAA to BBBB, the language of the characters is determined as Japanese (kanji); within the range of CCCC to DDDD, the language of the characters is determined as Japanese (hiragana); and within the range of EEEE to FFFF, the language of the characters is determined as Roman alphabet.

Whereas, within the range of GGGG to HHHH, the language of the characters is determined as Korean; and within the range of IIII to JJJJ, the language of the characters is determined as Chinese.

Here, there is shown the example in which the language of the characters is determined with reference to the character codes. However, this is merely one example. For example, when the language identification information for identifying the language of the characters is inputted in addition to the character codes by the character code input part 1, the language of the characters may be determined with reference to the language identification information.

The language type judging part 11 determines the language of the characters making up the character string, and when the language of the characters is Japanese (kanji) or Chinese (character being an ideographic character) (Step ST13), the character stroke count identifying part 13 identifies the stroke counts of the characters (attribute of characters) with reference to the character stroke count storing part 12 (Step ST14).

Namely, in the character stroke count storing part 12, there are recorded the stroke counts of various characters in Japanese (kanji) and Chinese (there are recorded the stroke counts of the characters corresponding to respective character codes), and hence the character stroke count identifying part 13 retrieves the stroke count of the character from the character stroke count storing part 12 using the character code inputted from the character code input part 1 as a key.

For example, when the character is "東" (To), a stroke count of 8 is retrieved, and when the character is "京" (Kyo), a stroke count of 8 is retrieved.

When the language of the characters is Japanese (kanji) or Chinese (Step ST13), the total stroke count identifying part 14 identifies the total stroke count of all the characters making up the character string (attribute of characters) with reference to the character stroke count storing part 12 (Step ST15).

For example, when the character string is "東京" (Tokyo), as described above, the stroke count of the character "東" (To) is 8, and the stroke count of the character "京" (Kyo) is 8, and hence the total sum of the stroke counts of respective characters is calculated, thereby to determine the total stroke count (16 strokes=8 strokes+8 strokes).

When the language of the characters is Japanese (kanji) or Chinese (Step ST13), the character familiarity identifying part 16 identifies the familiarity of the character (attribute of characters) with reference to the character familiarity storing part 15 (Step ST16).

Namely, in the character familiarity storing part 15, as shown in FIG. 11, there are recorded the familiarities (index indicating a degree of approachability with respect to each character) of various characters in Japanese (kanji) and Chinese (familiarity of a character corresponding to each character code is recorded), and hence the character familiarity identifying part 16 retrieves the familiarity of the character from the character familiarity storing part 15 with the character code inputted by the character code input part 1 as a key.

In the example of FIG. 11, a character with a higher familiarity is given a degree of familiarity with a higher numerical value. For the character with the highest familiarity, 7.00 is set.

It is noted that the data base recording therein the familiarity of the character corresponding to each character code is disclosed in, for example, the following Non-Patent Document:

NTT database series "Nihongo-no Goitokusei (Lexical properties of Japanese)" first edition, compiled by NTT Communication Science Laboratories.

Here, there is shown the case where, when the language of the characters is Japanese (kanji) or Chinese, the character familiarity identifying part 16 identifies the familiarities of the characters; however, when the next arrival station includes Japanese (hiragana) like "お茶の水" (Ochanomizu), for instance, it is also contemplated that the familiarity of "の" (No) which is hiragana is identified. Therefore, it is assumed that the character familiarity storing part 15 of FIG. 11 also includes the familiarity of the hiragana.

When the language of the characters determined by the language type judging part 11 is Japanese (hiragana), the Roman alphabet, or Korean (character being a phonetic character) (Step ST13), the character number identifying part 17 identifies the number of the characters making up the character string (attribute of characters) (Step ST17).

Namely, the character number identifying part 17 counts the number of the character codes inputted by the character code input part 1, thereby to identify the number of the characters making up the character string.

For example, when the character string is "とうきょう" (Tokyo), 5 character codes are inputted, and hence the number of the characters is identified to be 5.

When the language of the characters is Japanese (hiragana) (Step ST18), the character string familiarity identifying part 19 identifies the familiarity (attribute of characters) of the character string to be displayed with reference to the character string familiarity storing part 18 (Step ST19).

Namely, in the character string familiarity storing part 18, there are recorded the familiarities of various character strings in Japanese (hiragana) (e.g., the familiarities of "とうきょう" (Tokyo) and "おちゃのみず" (Ochanomizu) are recorded), and hence the character string familiarity identifying part 19 identifies the familiarity of the character string made up of the characters corresponding to the character codes inputted by the character code input part 1.

However, when the familiarity of the character string to be displayed is not registered in the character string familiarity storing part 18, the familiarities of the characters making up the character string are identified; thus, for example, the mean value of familiarities of respective characters, or the minimum value of the familiarities of respective characters is substituted for the familiarity of the character string.

When the language of the characters determined by the language type judging part 11 is the Roman alphabet or Korean (Step ST18), the character complexity identifying part 20 identifies the visual complexity (the attribute of the characters) with respect to the character string to be displayed (Step ST20).

For example, when the character string includes a digraph therein, the visual complexity with respect to the character string is judged as high. As the complexity of the character string, there is given a larger value than the threshold value C of the visual complexity described later.

On the other hand, when the character string does not include a digraph, the visual complexity with respect to the character string is judged as low. As the complexity of the character string, there is given a smaller value than the threshold value C.

Here, regarding the digraphs in the Roman alphabet, the following apply: a combination of two alphabetical letters indicates a new sound that is not inherent in each of the letters; for example, ch, ts, gh, ph, sh, ai, eu, ow, and so on are digraphs. Meanwhile, regarding the digraphs in Korean, a combination of two consonants applies as shown in FIG. 12.

When the language of the characters determined by the language type judging part 11 is Korean (Step ST21), the pronunciation difficulty identifying part 21 identifies the difficulty in pronunciation of the character string to be displayed (index indicating a degree of difficulty in pronunciation with respect to a character string) (Step ST22).

For example, when the character string includes therein fortis characters (see FIG. 13(*b*)), the difficulty in pronunciation of the character string is judged as high; thus, for the difficulty in pronunciation of the character string, there is given a larger value than the threshold value D of the difficulty in pronunciation described later.

On the other hand, when the character string includes no fortis character therein (see FIG. 13(*a*)), the difficulty in pronunciation of the character string is judged as low; thus, for the difficulty in pronunciation of the character string, there is given a smaller value than the threshold value D.

Here, a fortis sound is a sound involving an articulator muscle tension in phonetics, and the fortis sound is a sound difficult to pronounce. A lax sound relative to the fortis sound is called a lenis.

In Japanese, a double consonant corresponds to a fortis. However, before the double consonant, the same closed syllable consonant as the consonant accompanies, and hence, in the rhythm of pronunciation, it sounds like the double consonant itself being given one beat.

When the character stroke count identifying part 13 identifies the stroke count of the characters making up the character string, the first reading difficulty judging part 31 compares the stroke count of each character thereof with the threshold value P (Step ST31 of FIG. 8).

Unless the characters making up the character string to be displayed include therein a character whose stroke count identified by the character stroke count identifying part 13 exceeds the threshold value P, the first reading difficulty judging part 31 judges the character string as a character string easy to read (Step ST32).

On the other hand, when the characters making up the character string to be displayed include therein a character whose stroke count identified by the character stroke count identifying part 13 exceeds the threshold value P, the character string is judged as a character string difficult to read (Step ST33).

When the total stroke count identifying part 14 identifies the total stroke count of all the characters making up the character string, the second reading difficulty judging part 32 compares the total stroke count with the threshold value M (Step ST34).

Unless the total stroke count exceeds the threshold value M, the second reading difficulty judging part 32 judges the character string to be displayed as a character string easy to read (Step ST35).

On the other hand, if the total stroke count exceeds the threshold value M, the character string to be displayed is judged as a character string difficult to read (Step ST36).

When the character familiarity identifying part 16 identifies the familiarities of the characters making up the character string, the third reading difficulty judging part 33 compares the familiarity of each character with the threshold value S1 (Step ST37).

Unless the characters making up the character string to be displayed include therein a character whose familiarity identified by the character familiarity identifying part 16 is lower than the threshold value S1, the third reading difficulty judging part 33 judges the character string as a character string easy to read (Step ST38).

On the other hand, if the characters making up the character string to be displayed include therein a character whose familiarity identified by the character familiarity identifying part 16 is lower than the threshold value S1, the character string is judged as a character string difficult to read (Step ST39).

When the character number identifying part 17 identifies the number of characters making up the character string, the fourth reading difficulty judging part 34 compares the number with the threshold value N (Step ST40).

When the number of the characters is smaller than the threshold value N, the fourth reading difficulty judging part 34 judges the character string to be displayed as a character string easy to read (Step ST41).

On the other hand, when the number of the characters is equal to or larger than the threshold value N, the character string to be displayed is judged as a character string difficult to read (Step ST42).

When the character string familiarity identifying part 19 identifies the familiarity of the character string, the fifth reading difficulty judging part 35 compares the familiarity with the threshold value S2 (Step ST43).

When the familiarity of the character string is equal to or larger than the threshold value S2, the fifth reading difficulty judging part 35 judges the character string as a character string easy to read (Step ST44).

On the other hand, when the familiarity of the character string is lower than the threshold value S2, the character string is judged as a character string difficult to read (Step ST45).

When the character complexity identifying part 20 identifies the visual complexity of the character string, the sixth reading difficulty judging part 36 compares the visual complexity with the threshold value C (Step ST46).

When the visual complexity of the character string is lower than the threshold value C, the sixth reading difficulty judging part 36 judges the character string as a character string easy to read (Step ST47).

On the other hand, when the visual complexity of the character string is equal to or higher than the threshold value C, the character string is judged as a character string difficult to read (Step ST48).

When the pronunciation difficulty identifying part 21 identifies the difficulty in pronunciation of the character string, the seventh reading difficulty judging part 37 compares the difficulty in pronunciation with the threshold value D (Step ST49).

If the difficulty in pronunciation is lower than the threshold value D, the seventh reading difficulty judging part 37 judges the character string as a character string easy to read (Step ST50).

On the other hand, if the difficulty in pronunciation is equal to or higher than the threshold value D, the character string is judged as a character string difficult to read (Step ST51).

If all the judgment results of the reading difficulty judging parts each of which the judgment processing is executed out of the first to seventh reading difficulty judging parts 31 to 37 indicate to the effect that the character string to be displayed is a character string easy to read (Step ST52), the comprehensive judging part 38 finally judges the character string to be displayed as a character string easy to read (Step ST53).

However, when the language of the characters is Japanese (kanji) or Chinese, only the first to third reading difficulty judging parts 31, 32, and 33 execute the judgment processing; thus, if the judgment results of the first to third reading difficulty judging parts 31, 32, and 33 indicate to the effect that the character string to be displayed is a character string easy to read, finally, the character string to be displayed is judged as a character string easy to read.

Whereas, when the language of the characters is Japanese (hiragana), only the fourth and fifth reading difficulty judging parts 34 and 35 execute the judgement processing; thus, if the judgment results of the fourth and fifth reading difficulty judging parts 34 and 35 indicate to the effect that the character string to be displayed is a character string easy to read, finally, the character string to be displayed is judged as a character string easy to read.

Also, when the language of the characters is the Roman alphabet, only the fourth and sixth reading difficulty judging parts 34 and 36 execute the judgement processing; thus, if the judgment results of the fourth and sixth reading difficulty judging parts 34 and 36 indicate to the effect that the character string to be displayed is a character string easy to read, finally, the character string to be displayed is judged as a character string easy to read.

Also, when the language of the characters is Korean, only the fourth, sixth, and seventh reading difficulty judging parts 34, 36, and 37 execute the judgement processing; thus, if the judgment results of the fourth, sixth, and seventh reading difficulty judging parts 34, 36, and 37 indicate to the effect that the character string to be displayed is a character string easy to read, finally, the character string to be displayed is judged as a character string easy to read.

If the judgment result of at least one reading difficulty judging part of the first to seventh reading difficulty judging parts 31 to 37 indicates to the effect that the character string to be displayed is a character string difficult to read (Step ST52), the comprehensive judging part 38 finally judges the character string to be displayed as a character string difficult to read (Step ST54).

However, when the language of the characters is Japanese (kanji) or Chinese, only the first to third reading difficulty judging parts 31, 32, and 33 execute the judgment processing; thus, if any of the judgment results of the first to third reading difficulty judging parts 31, 32, and 33 indicates to the effect that the character string to be displayed is a character string difficult to read, finally, the character string to be displayed is judged as a character string difficult to read.

Whereas, when the language of the characters is Japanese (hiragana), only the fourth and fifth reading difficulty judging parts 34 and 35 execute the judgment processing; thus, if any of the judgment results of the fourth and fifth reading difficulty judging parts 34 and 35 indicates to the effect that the character string to be displayed is a character string difficult to read, finally, the character string to be displayed is judged as a character string difficult to read.

Also, when the language of the characters is the Roman alphabet, only the fourth and sixth reading difficulty judging parts 34 and 36 execute the judgment processing; thus, if any of the judgment results of the fourth and sixth reading difficulty judging parts 34 and 36 indicates to the effect that the character string to be displayed is a character string difficult to read, finally, the character string to be displayed is judged as a character string difficult to read.

Also, when the language of the characters is Korean, only the fourth, sixth, and seventh reading difficulty judging parts 34, 36, and 37 execute the judgment processing; thus, if any of the judgment results of the fourth, sixth, and seventh reading difficulty judging parts 34, 36, and 37 indicates to the effect that the character string to be displayed is a character string difficult to read, finally, the character string to be displayed is judged as a character string difficult to read.

When the display format of the character string is decided as full text simultaneous display by the display format deciding part 2 (when the number $M_N$ of characters of the character string to be displayed is equal to or smaller than the number $M_{N1G}$ of characters for one line on the screen), the display time setting part 5 sets the display time of the character string at a reference display time T1, if the judgment result of the comprehensive judging part 38 of the reading difficulty judging part 4 indicates to the effect that the character string to be displayed is a character string easy to read, and sets the display time of the character string at a longer time T2 than the reference display time T1, if the judgment result indicates to the effect that the character string to be displayed is a character string difficult to read.

Namely, the judgment result input part 41 of the display time setting part 5 inputs the final judgment result of the comprehensive judging part 38 in the reading difficulty judging part 4 (Step ST61 of FIG. 9).

When the display format of the character string decided by the display format deciding part 2 is full text simultaneous display, if the judgment result inputted by the judgment result input part 41 indicates to the effect that the character string to be displayed is a character string easy to read (Step ST62), the display time setting processing part 42 of the display time setting part 5 sets the display time of the character string to be displayed at the reference display time T1 (e.g., 2 sec) (Step ST63).

On the other hand, when the display format of the character string decided by the display format deciding part 2 is full text simultaneous display, if the judgment result inputted by the judgment result input part 41 indicates to the effect that the character string to be displayed is a character string difficult to read (Step ST62), the display time of the character string to be displayed is set at the display time T2 twice the reference display time T1 (Step ST64).

When the display format of the character string decided by the display format deciding part 2 is full text simultaneous display, upon setting of the display time of the character string by the display time setting part 5, the character string display part 7 simultaneously displays all the characters making up the character string to be displayed on the screen of the display 8 during the set display time (full text simultaneous display of a character string).

Hereinafter, the processing contents of the character string display part 7 will be specifically described.

When the display format of the character string is decided as full text simultaneous display by the display format deciding part 2, the display time input part 61 of the character string display part 7 inputs the display time T1 or T2 set by the display time setting processing part 42 of the display time setting part 5 (Step ST65).

If the display times of the character strings in all the languages (Japanese (kanji), Japanese (hiragana), the Roman alphabet, Korean, and Chinese) are T1 (Step ST66), the display format setting part 62 of the character string display part 7 adopts a display format in which the character strings in respective languages are simultaneously full text displayed in turn (Step ST67).

There is adopted a display format in which the character strings in respective languages are simultaneously full text displayed each during the display time T1 in the order of, for example, Japanese (kanji), Japanese (hiragana), the Roman alphabet, Korean, and Chinese.

When the display time of the character strings in some languages is T2, the display format setting part 62 adopts a display format in which the character strings in some languages are simultaneously full text displayed in a combined form (Step ST68).

Namely, if at least one display time of Japanese (kanji) and Japanese (hiragana) is T2, as shown in FIG. 14, there is adopted a display format in which Japanese (kanji) and Japanese (hiragana) are put in combination during the display time T2.

Whereas, if at least one display time of Korean and Chinese is T2, as shown in FIG. 15, there is adopted a display format in which Korean and Chinese are put in combination during the display time T2.

However, when the language of the characters is the Roman alphabet, if the number of the characters identified by the character number identifying part 17 is smaller than the threshold value N, the display format setting part 62 adopts a format in which the Roman character string is displayed on one line; but if the number of the characters is equal to or larger than the threshold value N, in order to enhance the readability of the character string, as shown in FIG. 16, the character string is sectioned into a plurality of sections (e.g., sectioned on a character string-forming word basis), and the character at the front of the section is displayed larger than the other ones. At this time, the character string may be displayed with sectioned into two lines, or the sections may be connected to each other by a hyphen.

Figure 17:
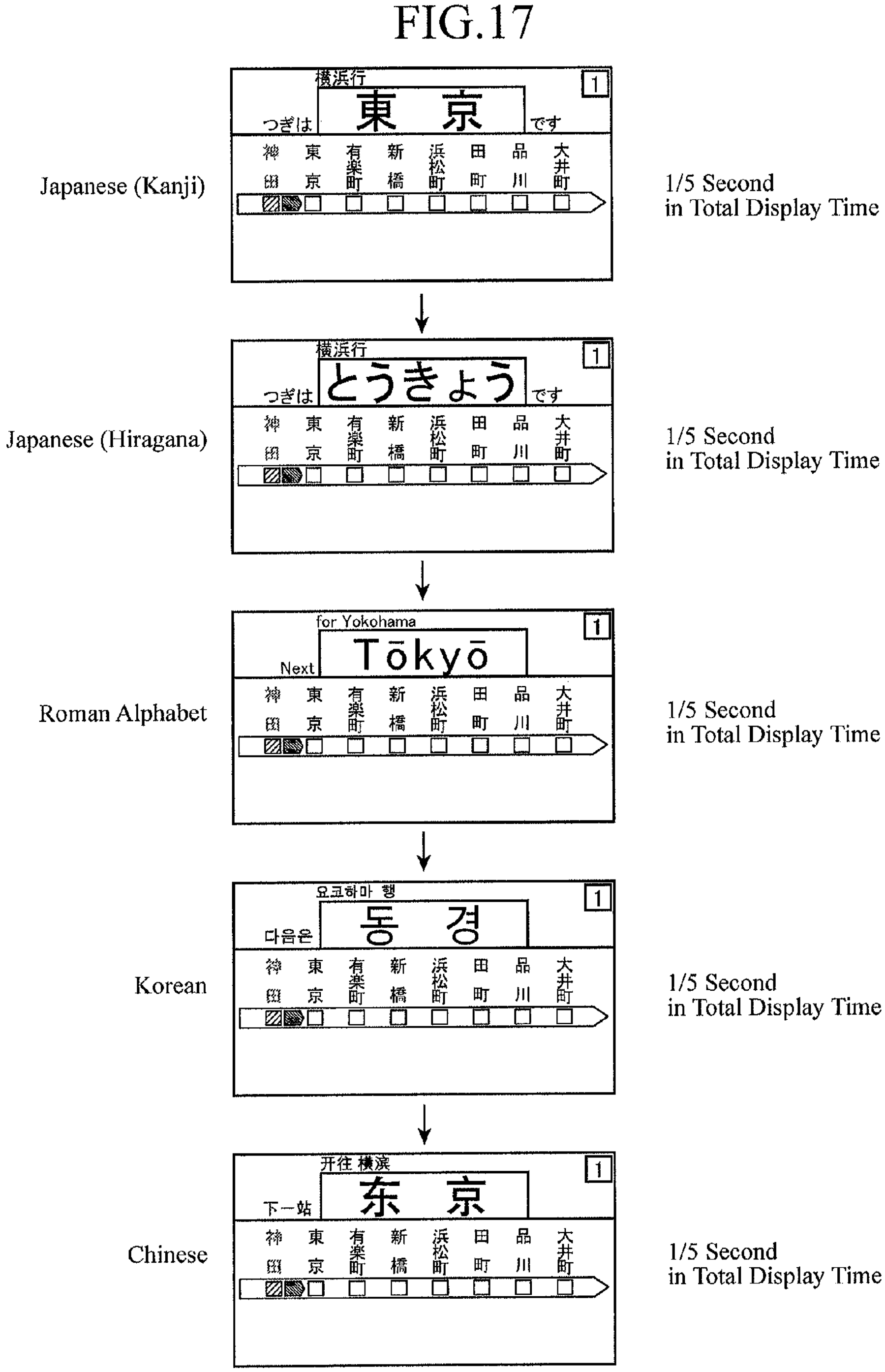
FIG. 17 is an explanatory view showing one example of a display format in which character strings in respective languages are in turn displayed.

When the display format setting part 62 adopts a display format in which the character strings in respective languages are simultaneously full text displayed in turn, for example, as shown in FIG. 17, the display processing part 63 simultaneously full text displays the character strings in respective languages in the order of Japanese (kanji), Japanese (hiragana), the Roman alphabet, Korean, and Chinese on the display 8 during the display time T1 for each of them (Step ST69).

When the display format setting part 62 adopts a display format in which the character strings in some languages are simultaneously full text displayed in a combined form, the display processing part 63 simultaneously full text displays the character strings in respective languages in turn with the character strings in some languages put in combination on the display 8 (Step ST70).

Figure 18:
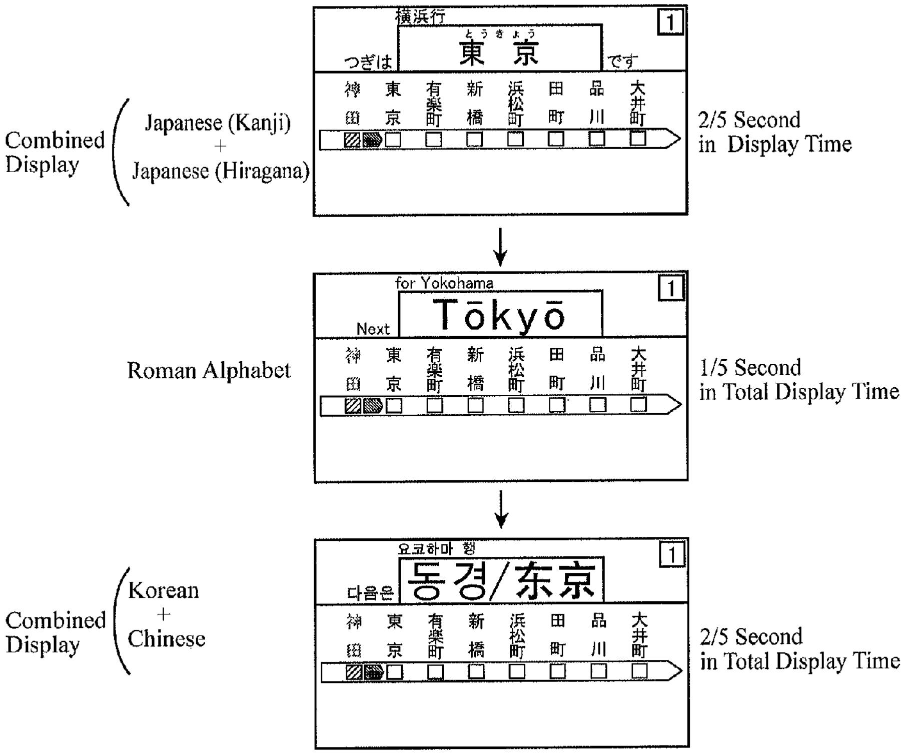
FIG. 18 is an explanatory view showing one example of a display format in which character strings in some languages are put in combination.

For example, when Japanese (kanji) and Japanese (hiragana) are put in combination, and Korean and Chinese are put in combination, as shown in FIG. 18, the character strings in respective languages are simultaneously full text displayed in the order of (Japanese (kanji)+Japanese (hiragana)), the Roman alphabet, and (Korean+Chinese) on the display 8.

In this case, each display time of (Japanese (kanji)+Japanese (hiragana)) and (Korean+Chinese) is set at T2, and the display time of the Roman alphabet is set at T1.

When the display format of the character string is decided as telop display by the display format deciding part 2 (when the number $M_N$ of the characters of the character string to be displayed exceeds the number $M_{N1G}$ of characters for one line on the screen), the scroll speed setting part 6 sets the scroll speed of the character string to be displayed at the reference speed V1, if the judgment result of the comprehensive judging part 38 of the reading difficulty judging part 4 indicates to the effect that the character string to be displayed is a character string easy to read, and sets the scroll speed of the character string to be displayed at the slower speed V2 than the reference speed V1, if the judgment result indicates to the effect that the character string to be displayed is a character difficult to read.

Namely, the judgment result input part 51 of the scroll speed setting part 6 inputs the final judgment result of the comprehensive judging part 38 in the reading difficulty judging part 4 (Step ST71 of FIG. 10).

When the display format of the character string decided by the display format deciding part 2 is telop display, if the judgment result inputted by the judgment result input part 51 indicates to the effect that the character string to be displayed is a character string easy to read (Step ST72), the scroll speed setting processing part 52 of the scroll speed setting part 6 sets the scroll speed of the character string to be displayed at the reference speed T1 (e.g., 20 cm/sec) (Step ST73).

On the other hand, when the display format of the character string decided by the display format deciding part 2 is telop display, if the judgment result inputted by the judgment result input part 51 indicates to the effect that the character string to be displayed is a character string difficult to read (Step ST72), the scroll speed of the character string to be displayed is set at the speed V2 half the reference speed T1 (Step ST74).

When the display format of the character string decided by the display format deciding part 2 is telop display, upon setting of the scroll speed of the character string by the scroll speed setting part 6, the character string display part 7 telop-displays the character string to be displayed on the screen of the display 8 at the scroll speed.

Hereinafter, the processing contents of the character string display part 7 will be specifically described.

When the display format of the character string is decided as telop display by the display format deciding part 2, the scroll speed input part 64 of the character string display part 7 inputs the scroll speed V1 or V2 set by the scroll speed setting processing part 52 of the scroll speed setting part 6 (Step ST75).

If the scroll speed of the character strings of all the languages (Japanese (kanji), Japanese (hiragana), the Roman alphabet, Korean, and Chinese) is V1 (Step ST76), the display format setting part 65 of the character string display part 7 adopts a display format in which the character strings in respective languages are in turn telop-displayed (Step ST77).

There is adopted a display format in which the character strings in respective languages are telop-displayed in the order of, for example, Japanese (kanji), Japanese (hiragana), the Roman alphabet, Korean, and Chinese at the scroll speed V1.

When the scroll speed of the character strings in some languages is V2, the display format setting part 65 adopts a display format in which the character strings in some languages are telop-displayed in a combined form (Step ST78).

Namely, if the scroll speed of at least one of Japanese (kanji) and Japanese (hiragana) is V2, there is adopted a display format as follows: as shown in FIG. 14, Japanese (kanji) and Japanese (hiragana) are put in combination, and the combined character strings are telop-displayed at the scroll speed V2.

Whereas, if the scroll speed of at least one of Korean and Chinese is V2, there is adopted a display format in which Korean and Chinese are put in combination, and the combined character strings are telop-displayed at the scroll speed V2 as shown in FIG. 15.

However, when the language of the characters is the Roman alphabet, if the number of the characters identified by the character number identifying part 17 is smaller than the threshold value N, the display format setting part 65 adopts a format in which the Roman character string is displayed in one line, but if the number of the characters is equal to or larger than the threshold value N, in order to enhance the readability of the character string, as shown in FIG. 16, the character string is sectioned into a plurality of sections (e.g., sectioned on a character string-forming word basis), and the character at the front of each section is displayed larger than the other ones. At this time, the character string may be displayed with sectioned into two lines, or the sections may be connected to each other by a hyphen.

When the display format setting part 65 adopts a display format in which the character strings in respective languages are telop-displayed in turn, the display processing part 66 telop-displays the character strings in respective languages in the order of, for example, Japanese (kanji), Japanese (hiragana), the Roman alphabet, Korean, and Chinese (see FIG. 17 in the case of full text simultaneous display) on the display 8 at the scroll speed V1 (Step ST79).

Figure 19:
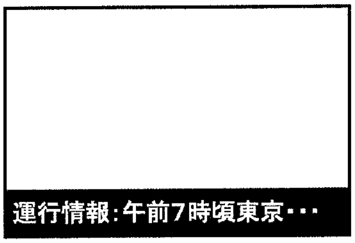
FIG. 19 is an explanatory view showing a telop display example when a character string to be displayed is “運行情報：午前７時頃東 京駅構内で発生した人身 事故の影響で運転を見合わせています。” (Operation information: the operation has been suspended under the influence of an accident resulting in injury or death that occurred in the Tokyo station yard at 7 a.m.).

Otherwise, FIG. 19 is an explanatory view showing a telop display example in the case where the character string to be displayed is "運行情報 午前7時頃東京駅構内で発生した人身事故の影響で運転を見合わせています。" (Operation information: the operation has been suspended under the influence of an accident resulting in injury or death that occurred in the Tokyo station yard at 7 a.m.).

FIG. 19 shows an example of a telop in which the character string to be displayed flows from right to left in the bottom region of the display 8.

When the display format setting part 65 adopts a display format in which the character strings in some languages are telop-displayed in a combined form, the display processing part 66 telop-displays the character strings in respective languages in turn with the character strings in some languages put in combination on the display 8 (Step ST80).

For example, when Japanese (kanji) and Japanese (hiragana) are put in combination, and Korean and Chinese are put in combination, the character strings in respective languages are telop-displayed in the order of (Japanese (kanji)+Japanese (hiragana)), the Roman alphabet, and (Korean+Chinese) (see FIG. 18 in the case of full text simultaneous display) on the display 8.

In this case, each scroll speed of (Japanese (kanji)+Japanese (hiragana)) and (Korean+Chinese) is set at V2, and the scroll speed of the Roman alphabet is set at V1.

As is apparent from the above, in accordance with Embodiment 1, there are disposed: the display format deciding part 2 which identifies the number of characters making up the character string to be displayed from the character codes inputted from the character code input part 1, and decides the display format of the character string as telop display when the number of the characters exceeds the number of characters for one line on the screen, and decides the display format of the character string as full text simultaneous display when the number of characters making up the character string to be displayed is equal to or smaller than the number of characters for one line on the screen; the character attribute determining part 3 which identifies the characters making up the character string to be displayed from the character codes inputted by the character code input part 1, and determines the attributes of the characters; the reading difficulty judging part 4 which takes into consideration the attributes of the characters determined by the character attribute determining part 3, and judges whether the character string to be displayed is a character string easy to read or a character string difficult to read; and the scroll speed setting part 6 which, when the display format of the character string is decided as telop display by the display format deciding part 2, sets the scroll speed of the character string to be displayed at the reference speed, if the character string is judged as a character string easy to read by the reading difficulty judging part 4, and sets the scroll speed of the character string to be displayed at a slower speed than the reference speed, if the character string is judged as a character string difficult to read by the reading difficulty judging part 4; thus, it is configured as follows: the character string display part 7 telop-displays the character string to be displayed at the scroll speed set by the scroll speed setting part 6, when the display format of the character string is decided as telop display by the display format deciding part 2; and simultaneously displays all the characters making up the character string to be displayed on the screen, when the display format of the character string is decided as full text simultaneous display by the display format deciding part 2. Accordingly, for every character string to be displayed, a proper display format and/or a scroll speed are decided; as a result, there is rendered an advantageous effect such that a high-visibility character string display can be performed.

Further, in accordance with Embodiment 1, there is disposed the display time setting part 5 which, when the display format of the character string is decided at full text simultaneous display by the display format deciding part 2, sets the display time of the character string to be displayed at the reference display time, if the character string to be displayed is judged as a character string easy to read by the reading difficulty judging part 4; and sets the display time of the character string to be displayed at a longer time than the reference display time, if the character string to be displayed is judged as a character string difficult to read by the reading difficulty judging part 4, wherein the character string display part 7 displays the character string to be displayed on the display 8 during the display time set by the display time setting part 5; thus, a proper display time required for reading can be set for every character string to be displayed. As a result, there is rendered an advantageous effect such that the next arrival station and the like can be guided in a large number of languages during a limited time (during a time between stations, if in a train).

However, in Embodiment 1, there is shown the case where the reference display times of the character strings in respective languages (Japanese (kanji), Japanese (hiragana), the Roman alphabet, Korean, and Chinese) are uniformly T1. However, the reference display time may differ for each character string in the languages.

Specifically, for example, it may be set as follows: the reference display time of Japanese (kanji) is 3 seconds; the reference display time of Japanese (hiragana) is 2 seconds; the reference display time of the Roman alphabet is 2 seconds; the reference display time of Korean is 2 seconds; and the reference display time of Chinese is 3 seconds.

In Embodiment 1, there is shown the one including the first to third reading difficulty judging parts 31, 32, and 33 for executing the judgement processing when the language of the characters is Japanese (kanji) or Chinese mounted therein. However, so long as at least one of the first to third reading difficulty judging parts 31, 32, and 33 is mounted therein, although the judgment precision is somewhat deteriorated, a small hardware scale thereof can cope with the case where the language of the characters is Japanese (kanji) or Chinese.

In Embodiment 1, there is shown the one including the fourth and fifth reading difficulty judging parts 34 and 35 for executing the judgement processing when the language of the characters is Japanese (hiragana) mounted therein. However, so long as at least one of the fourth and fifth reading difficulty judging parts 34 and 35 is mounted therein, although the judgment precision is somewhat deteriorated, a small hardware scale thereof can cope with the case where the language of the characters is Japanese (hiragana).

In Embodiment 1, there is shown the one including the fourth and sixth reading difficulty judging parts 34 and 36 for executing the judgement processing when the language of the characters is the Roman alphabet mounted therein. However, so long as at least one of the fourth and sixth reading difficulty judging parts 34 and 36 is mounted therein, although the judgment precision is somewhat deteriorated, a small hardware scale thereof can cope with the case where the language of the characters is the Roman alphabet.

In Embodiment 1, there is shown the one including the fourth, sixth, and seventh reading difficulty judging parts 34, 36, and 37 for executing the judgement processing when the language of the characters is Korean mounted therein. However, so long as at least one of the fourth, sixth, and seventh reading difficulty judging parts 34, 36, and 37 is mounted therein, although the judgment precision is somewhat deteriorated, a small hardware scale thereof can cope with the case where the language of the characters is Korean.

Figure 20:
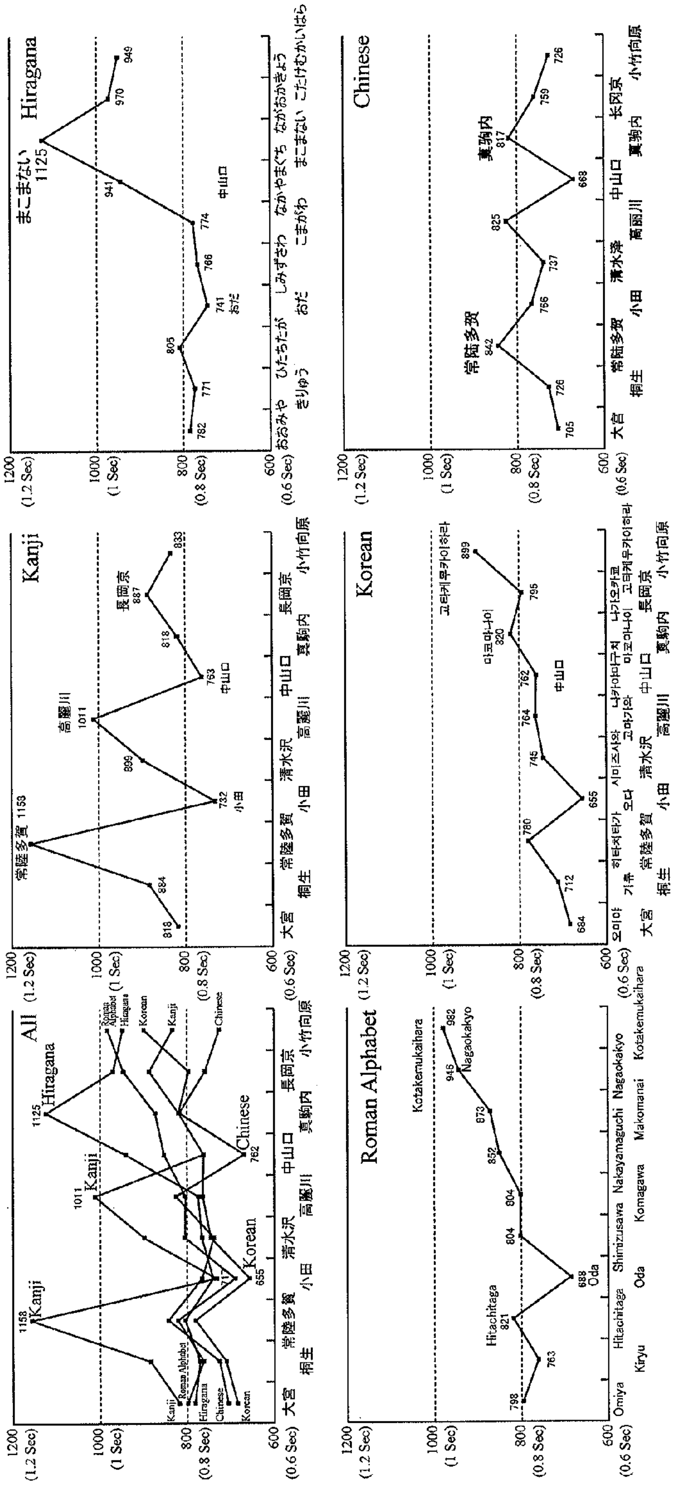
FIG. 20 is an explanatory view showing experimental results of user's recognition times with character strings in respective languages.

Here, FIG. 20 is an explanatory view showing the experimental results of the user's recognition times with respect to character strings in respective languages.

As is also apparent from FIG. 20, when the attributes of characters (e.g., the stroke count of the character, the total stroke count of all the characters, the familiarity of the character, the number of characters, the familiarity of the character string, the complexity of the character, and the difficulty in pronunciation) are changed, the user's recognition times to the character strings are changed. As mentioned above, if the display time of the character string is properly set according to the attributes of the characters, it is possible to guide the next arrival station and the like in a large number of languages during a limited time.

In Embodiment 1, the threshold values P, M, S1, N, S2, C, and D are appropriately set in view of the user's recognition time of FIG. 20 and the running time between stations. However, for example, the threshold value S1 related to the familiarity of the character, and the threshold value S2 related to the familiarity of the character string may be set in consideration of an area where the character information display device is used, and the like.

Namely, for example, the station name of "真駒内" (Makomanai) of Hokkaido is considered to be high in familiarity for users living in Hokkaido, but considered to be low in familiarity for users living in areas different from Hokkaido, and therefore, when the character information display device is used in Hokkaido, the threshold values S1 and S2 are set at high values, and when the character information display device is used in areas different from Hokkaido, the threshold values S1 and S2 are set at low values.

In Embodiment 1, there is shown the system in which when the display processing part 63 of the display time setting part 5 in turn displays the character strings in respective languages, the character strings in respective languages are handled as still pictures, and the still pictures are in turn switched. However, there may be employed an animation display system which gradually changes from the character string being currently displayed to the character string to be displayed next.

Figure 21:
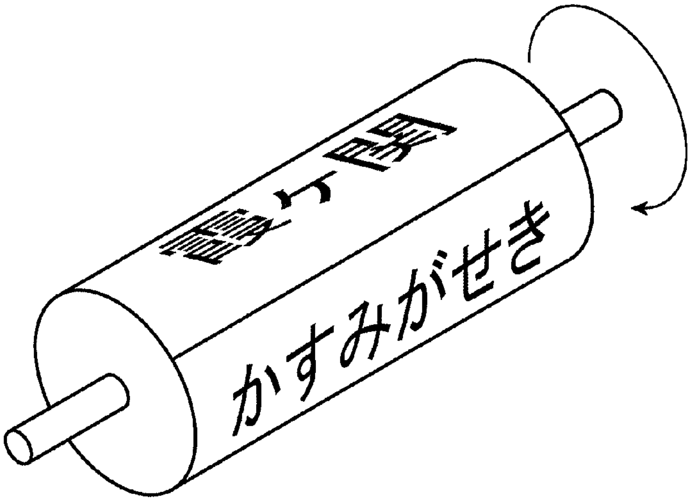
FIG. 21 is an explanatory view showing one example of a 3D display component for displaying character strings in respective languages.

In this case, the display processing part 63 of the display time setting part 5 constructs a 3D display component for displaying character strings in respective languages as shown in FIG. 21 (a constructing method of the 3D display component is a known technology, and hence, detailed descriptions thereof will be omitted).

Figure 22:
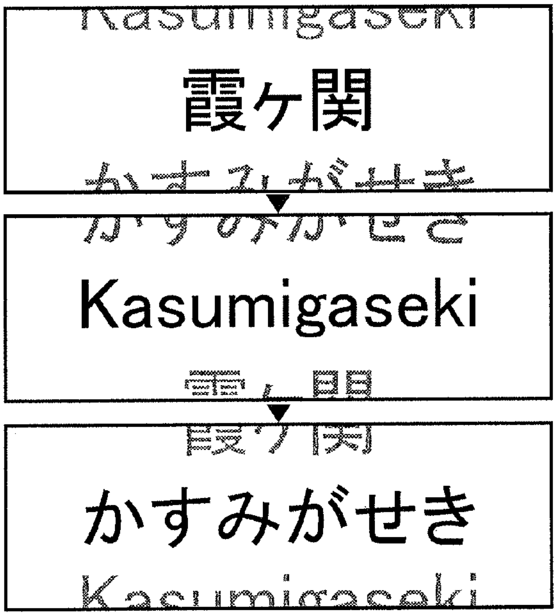
FIG. 22 is an explanatory view showing one example of an animation display gradually changing from a character string being currently displayed to a character string to be subsequently displayed.

The display processing part 63 constructs the 3D display component, and then, rotates the 3D display component in the direction of an arrow in the drawing (a rotating method of the 3D display component is also a known technology, and hence detailed descriptions thereof will be omitted); consequently, as shown in FIG. 22, the character strings in respective languages can be in turn displayed.

As mentioned above, there is employed the animation display which gradually changes from the character string being currently displayed to the character string to be displayed next, when the displays of the character strings are switched; thus, there is rendered an advantageous effect such that a smooth change of the displays can be performed.

Embodiment 2

Figure 23:
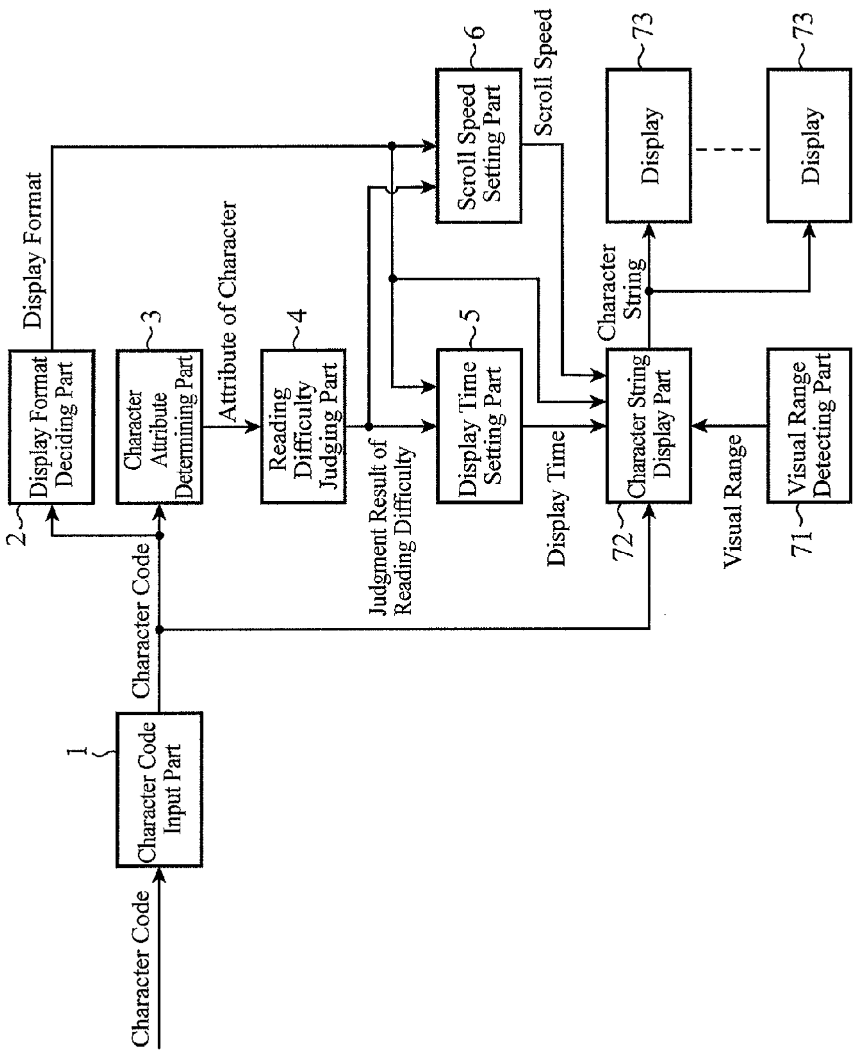
FIG. 23 is a block diagram showing a character information display device in accordance with Embodiment 2 of the invention.

FIG. 23 is a block diagram showing a character information display device in accordance with Embodiment 2 of the invention. In the drawing, the same reference numerals and signs as those of FIG. 1 denote the same or similar portions, and hence descriptions thereof will be omitted.

A description will be given to an example in which the character information display device of Embodiment 2 is applied to a device for telop-displaying character strings indicating train operation information, shopping information, and the like in multilanguage on a plurality of displays 73 that are installed at, for example, a station precinct, a shopping mall, and so on.

A visual range detecting part 71 is configured by, for example, an infrared transmitter, an infrared receiver, and so on, and executes the processing of detecting a user's visual range (distance) to the display 73, when the character strings are displayed on the screens of the plurality of displays 73 (indicators).

Namely, the visual range detecting part 71 executes the processing of measuring a time required for the following: when an infrared signal is transmitted from the infrared transmitter installed in the vicinity of the display 73, then the infrared signal is reflected by a user to be returned (the time until the infrared receiver installed in the vicinity of the display 73 receives the infrared signal), and calculating the user's visual range with respect to the display 73 from the time.

Alternatively, a camera configuring the visual range detecting part 71 takes a photograph of the user, and in the taken photograph, executed is the processing of calculating the user's visual range with respect to the display 73 from the size of a region in which the user is taken.

Incidentally, the visual range detecting part 71 configures a visual range detecting unit.

The character string display part 72 executes the same processing as that of the character string display part 7 of FIG.

1 (if the number of the displays for displaying the character strings is one, the processing contents are the same as those of the character string display part 7 of FIG. 1); in addition to this, when the number of the displays for displaying the character strings is plural, the character string display part 72 executes the following processing.

Namely, the character string display part 72 executes the processing of telop-displaying the character string to be displayed on each of the screens of a plurality of the displays 73, when the user's visual range detected by the visual range detecting part 71 is shorter than the reference distance, and telop-displaying the character string to be displayed, by using the screens of a plurality of the displays 73 as one large screen, on such a large screen, when the user's visual range is longer than the reference distance.

Incidentally, the character string display unit is configured by the character string display part 72 and the displays 73.

Figure 24:
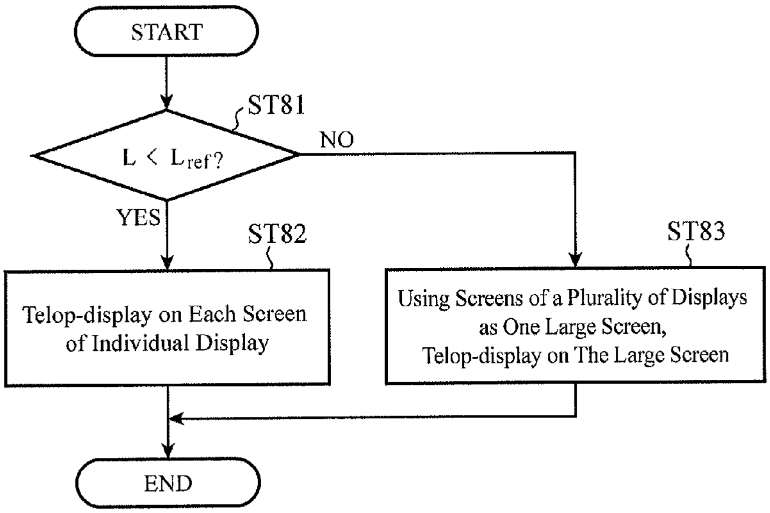
FIG. 24 is a flowchart showing the processing contents of a character string display part 72 of the character information display device in accordance with Embodiment 2 of the invention.

FIG. 24 is a flowchart showing the processing contents of the character string display part 72 of the character information display device in accordance with Embodiment 2 of the invention.

Next, an operation thereof will be described.

However, parts except the visual range detection part 71 and the character string display part 72 are the same as those of Embodiment 1, and hence a description will be given to only the processing contents of the visual range detecting part 71 and the character string display part 72.

For example, in the station precinct, shopping mall, and so on, the plurality of displays 73 may be installed to be arranged side by side (in a line).

In such a case, different images may be displayed on the plurality of displays 73, and with the screens of the plurality of displays 73 as one large screen, an image may be displayed on the large screen.

The visual range detecting part 71 detects the user's visual range L with respect to the display 73, and outputs the visual range information indicating the visual range L to the character string display part 72.

The character string display part 72 receives visual range information from the visual range detecting part 71, and then compares the user's visual range L indicated by the visual range information with the reference distance $L_{ref}$ (Step ST81).

Here, the reference distance $L_{ref}$ is a set value to be set at a larger value with an increase in screen size of the display 73 (because a distance for an easier viewing is to be increased with the increase in screen size of the display 73).

When the user's visual range L is shorter than the reference distance $L_{ref}$ ($L<L_{ref}$), the user is too close to the displays 73; thus, when the screens of the plurality of the displays 73 are used as one large screen, it is difficult to look out over the entire large screen.

Figure 25:
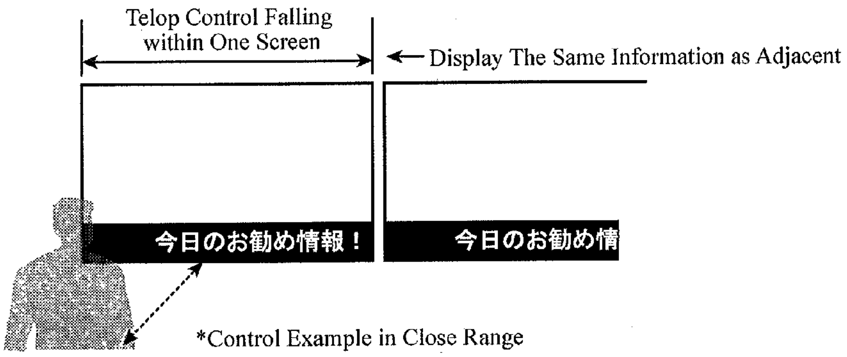
FIG. 25 is an explanatory view showing an example in which a character string to be displayed "今日のお勧め情報！！駅ナ カ店舗を 利用するとお ;得なクーポン券 をゲットできる。この機会 . . . " (Today's recommendation information!! Using in-station stores, you can get valuable coupons. On this opportunity is telop-displayed on each screen of individual displays 73.

In this case, the character string display part 72 telop-displays the character string to be displayed on the screen of the individual display 73 as shown in FIG. 25 (Step ST82).

FIG. 25 shows an example in which the character string to be displayed "今日のお勧め情報！！ 駅ナカ店舗を 利用するとお得なクーポン券をゲ ットできる。この機会" (Today's recommendation information ! ! Using in-station stores, you can get valuable coupons. On this opportunity on each of the screens of the individual displays 73.

When the user's visual range L is longer than the reference distance $L_{ref}$ ($L \geq L_{ref}$), the user is not too close to the displays 73; thus, even when the screens of the plurality of the displays 73 are used as one large screen, it is possible to look out over the entire large screen with ease.

Figure 26:
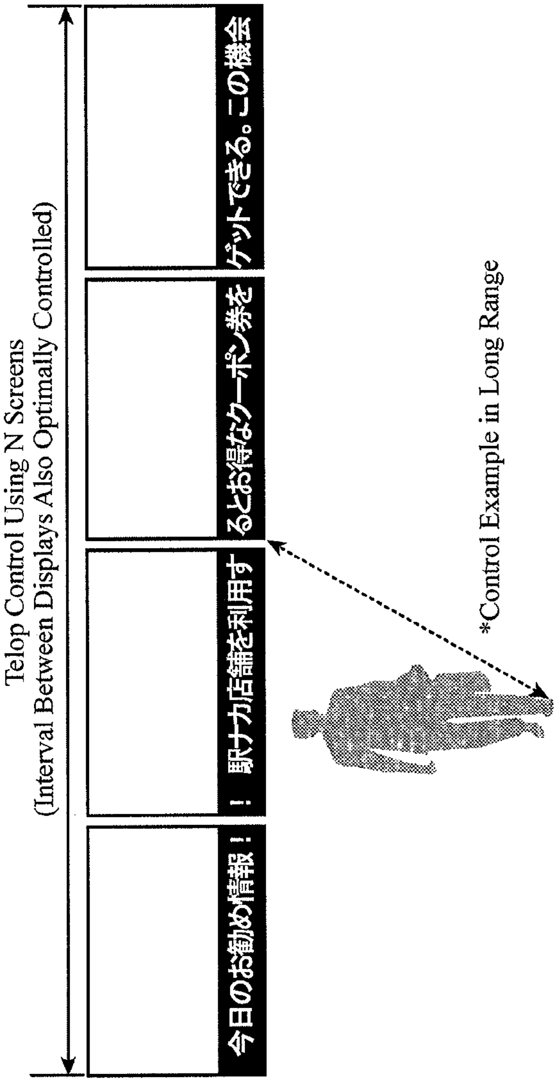
FIG. 26 is an explanatory view showing an example in which the character string to be displayed "今日のお勧め情報！！駅ナ カ店舗 を利用すると お得なクーポ ン券をゲットできる。この機会 . . . " (Today's recommendation information!! Using in-station stores, you can get valuable coupons. On this opportunity is telop-displayed on the screens of the N displays 73 as one large screen.

In this case, the character string display part 72 uses the screens of the plurality of the displays 73 as one large screen, and telop-displays the character string to be displayed on the large screen as shown in FIG. 26 (Step ST83).

FIG. 26 shows an example in which the character string to be displayed "今日のお勧め情 報!! 駅ナカ店 舗を利用するとお得なクーポン 券をゲ ットできる。この機会" . . . . (Today's recommendation information !! Using in-station stores, you can get valuable coupons. On this opportunity is telop-displayed using the screens of the N displays 73 as one large screen.

As is apparent from the above, in accordance with Embodiment 2, there is provided the visual range detecting part 71 for detecting the user's visual range L with respect to the display 73; thus, it is configured as follows: the character string display part 72 telop-displays the character string to be displayed on each of the screens of the plurality of displays 73 when the user's visual range L detected by the visual range detecting part 71 is shorter than the reference distance $L_{ref}$; and, using the screens of a plurality of displays 73 as one large screen, telop-displays the character string to be displayed on the corresponding large screen when the user's visual range L is longer than the reference distance $L_{ref}$; therefore, even when a user is close to the display 73, and even when a user is distant from the display 73, there is rendered an advantageous effect such that a telop display easy to watch can be performed.

Embodiment 3

Figure 27:
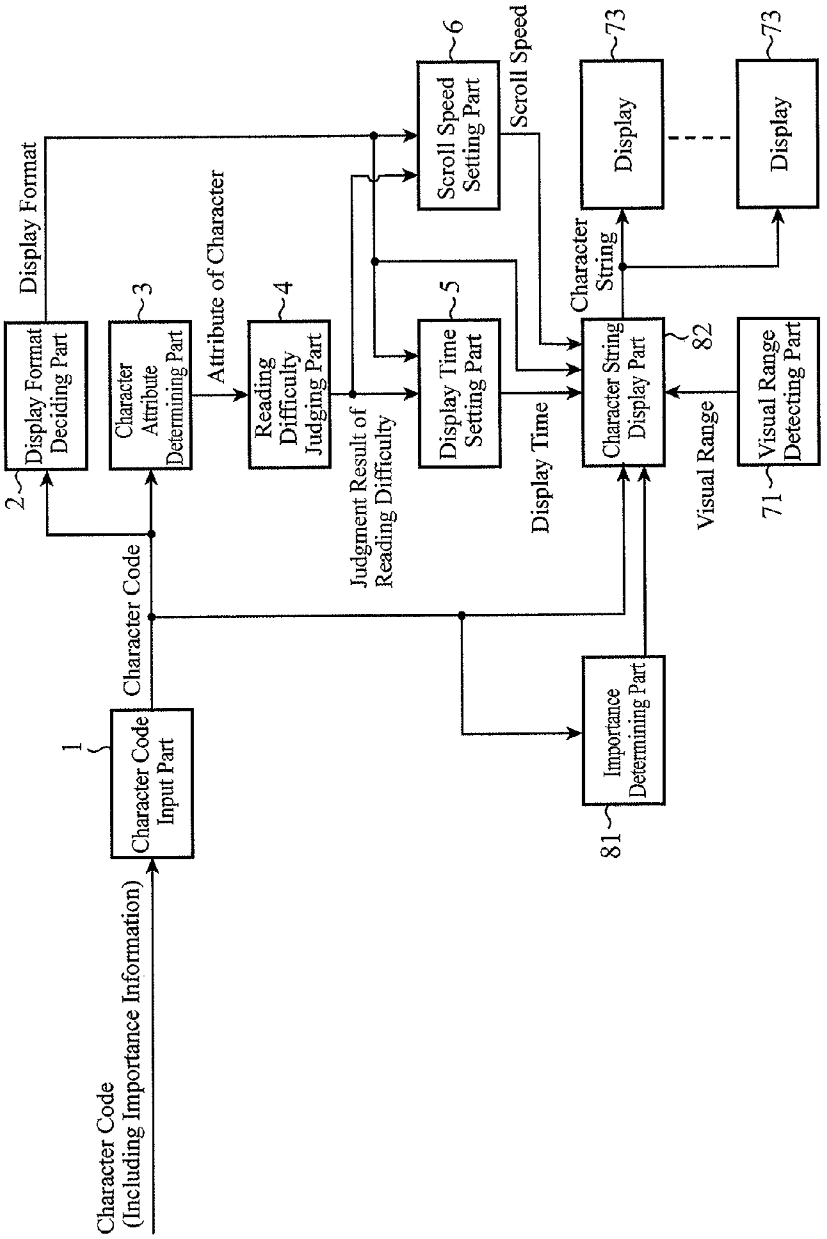
FIG. 27 is a block diagram showing a character information display device in accordance with Embodiment 3 of the invention.

FIG. 27 is a block diagram showing a character information display device in accordance with Embodiment 3 of the invention. In the drawing, the same reference numerals and signs as those of FIG. 23 denote the same or similar portions, and hence descriptions thereof will be omitted.

In Embodiment 3, it is assumed that the character code to which importance information indicating the importance of a character string to be displayed (for example, flag information indicating to the effect that the character string is related to emergency information) is inputted by a character code input part 1.

An importance determining part 81 is configured by, for example, a CPU-mounting semiconductor integrated circuit, a one chip microcomputer, and so on, and executes the processing of determining the importance of the character string to be displayed with reference to the importance information added to the character code inputted by the character code input part 1. Incidentally, the importance determining part 81 configures an importance determining unit.

A character string display part 82 executes the same processing as those of the character string display part 7 of FIG. 1 and the character string display part 72 of FIG. 23; in addition to this, when the display format of the character string is decided as telop display by the display format deciding part 2, the part 82 executes the processing of telop-displaying the character string by a display method corresponding to the importance determined by the importance determining part 81.

Incidentally, the character string display part 82 and the display 73 form a character string display unit.

Next, an operation thereof will be described.

However, parts except the importance determining part 81 and the character string display part 82 are the same as those of the above Embodiments 1 and 2, and hence a description will be given to only the processing contents of the importance determining part 81 and the character string display part 82.

The importance determining part 81 determines the importance of the character string to be displayed with reference to the importance information added to the character code inputted by the character code input part 1.

As the character strings which are "low" in importance, for example, the character strings related to announcement information unrelated to the operation (such as information about station facilities) apply.

As the character strings which are "intermediate" in importance, for example, the character strings related to the following (1) to (5) apply.

(1) Operation irregularity information (announcement of situation regarding own routes, recovery situation)

(2) Operation irregularity information (announcement of situation regarding other company routes and changing routes, recovery situation)

(3) Failure information (information regarding failure/malfunction in own routes or own trains)

(4) First aid information (emergency aid information, information regarding measures taken for passenger's psychosomatic disorder)

(5) Crime information/crime countermeasure information (information regarding measures upon occurrence of a crime in a train)

As the character strings which are "high" in importance, for example, the character strings related to the following (1) to (4) apply.

(1) Disaster information/disaster prevention information (earthquake information, typhoon information)

(2) Failure information/accident information (emergency stop, recovery information after stop)

(3) First aid information (information when measures affecting people's lives are required)

(4) Public emergency information/accident information (terrorism information, large-scale crime information)

When the display format of the character string is decided as telop display by the display format deciding part 2, the character string display part 82 telop-displays the character string as in the character string display part 7 of FIG. 1 and the character string display part 72 of FIG. 23; however, the part 82 is different from the character string display part 7 of FIG. 1 and the character string display part 72 of FIG. 23 in telop-displaying the character string by a display method corresponding to the importance determined by the importance determining part 81.

Hereinafter, the processing contents of the character string display part 82 will be specifically described.

When the importance determined by the importance determining part 81 is "low", the character string display part 82 telop-displays the character string to be displayed at the scroll speed set by the scroll speed setting part 6 as in the character string display part 7 of FIG. 1 and the character string display part 72 of FIG. 23.

When the importance determined by the importance determining part 81 is "intermediate", the character string display part 82 executes highlighting of the character string (for example, blinking of the character string, change in color, display of an icon, and so on) when it telop-displays the character string to be displayed in order for users to widely notice the situation in which the character string is displayed.

Or, in order for the character string to be thoroughly read by users, the character string to be displayed is telop-displayed at a slower speed than the scroll speed set by the scroll speed setting part 6.

Or, when the character string to be displayed is telop-displayed, an alarm sound is reproduced.

When the importance determined by the importance determining part 81 is "high", the character string display part 82 stops telop-displaying, and displays the character string on the whole of the display 73 in order to allow the character string to be read with reliability.

Figure 28:
FIG. 28 is an explanatory view showing an example in which a character string is displayed on the whole of the display 73.

FIG. 28 is an explanatory view showing an example in which the character string is displayed on the whole of the display 73.

In FIG. 28, there is shown an example in which the character string to be displayed is "急停車します！ 吊革や手すりにおつかまりくだ さい。WARNING Please hold on."

Figure 29:
FIG. 29 is an explanatory view showing an example in which a reason for a sudden stop is telop-displayed in a bottom region of the screen.

In FIG. 28, there is shown an example in which the character string to be displayed is displayed on the whole of the display 73. However, as shown in FIG. 29, in the bottom region of the screen, for example, a reason for a sudden stop (for example, information indicating to the effect that a person is in the track) may be telop-displayed.

As is apparent from the above, in accordance with Embodiment 3, there is provided the importance determining part 81 which determines the importance of the character string to be displayed with reference to the importance information added to the character code inputted by the character code input part 1; thus, it is configured such that when the display format of the character string is decided as telop display by the display format deciding part 2, the character string display part 82 telop-displays the character string by the display method corresponding to the importance determined by the importance determining part 81; therefore, there is rendered an advantageous effect such that the character string high in importance can be notified to users with reliability.

In Embodiment 3, there is shown the case where the character string is telop-displayed by the display method corresponding to the importance determined by the importance determining part 81. However, it may be configured such that the region on the screen on which the character string is telop-displayed is changed according to the importance determined by the importance determining part 81.

For example, when the importance determined by the importance determining part 81 is "low", display is executed in the bottom region of the screen. When the importance is "intermediate", display is executed in the top region of the screen.

Also, when the importance is "high", display is executed in the central region of the screen.

Incidentally, according to the present invention, within the scope of the invention, any components in the embodiments can be modified or any components in the embodiments can be omitted.

INDUSTRIAL APPLICABILITY

As described above, in accordance with the character information display device and the character information display method of the present invention, proper display format and scroll speed are decided for every character string to be displayed; as a result, it is possible to implement a character string display that is high in visibility; therefore, it is suitable to be employed for a character information display device, a character information display method, and so on that telop-display character strings indicating train operation information, shopping information, and the like on an information board in a train, a bulletin board in a station or a shopping mall, and the like.

EXPLANATION OF REFERENCE NUMERALS

1 Character code input part, 2 Display format deciding part (display format deciding unit), 3 Character attribute determining part (character attribute determining unit), 4 Reading difficulty judging part (reading difficulty judging unit), 5 Display time setting part (display time setting unit), 6 Scroll speed setting part (scroll speed setting unit), 7 Character string display part (character string display unit), 8 Display (character string display unit), 11 Language type judging part, 12 Character stroke count storing part, 13 Character stroke count identifying part, 14 Total stroke count identifying part, 15 Character familiarity storing part, 16 Character familiarity identifying part, 17 Character number identifying part, 18 Character string familiarity storing part, 19 Character string familiarity identifying part, 20 Character complexity identifying part, 21 Pronunciation difficulty identifying part, 31 First reading difficulty judging part, 32 Second reading difficulty judging part, 33 Third reading difficulty judging part, 34 Fourth reading difficulty judging part, 35 Fifth reading difficulty judging part, 36 Sixth reading difficulty judging part, 37 Seventh reading difficulty judging part, 38 Comprehensive judging part, 41 Judgment result input part, 42 Display time setting processing part, 51 Judgment result input part, 52 Scroll speed setting processing part, 61 Display time input part, 62 Display format setting part, 63 Display processing part, 71 Visual range detecting part (visual range detecting unit), 72, 82 Character string display part (character string display unit), 73 Display (character string display unit), 81 Importance determining part (importance determining unit).

The invention claimed is:

1. A character information display device, comprising:

a display format deciding unit for deciding that, based on a length of a character string to be displayed, a display format of the character string to be displayed is telop display or full text simultaneous display, a character attribute determining unit for determining attributes of characters making up the character string to be displayed, a reading difficulty judging unit for judging whether the character string to be displayed is a character string easy to read, or a character string difficult to read based on the attributes of the characters determined by the character attribute determining unit, a scroll speed setting unit for, when decision is made by the display format deciding unit that the display format of the character string is telop display, setting a scroll speed of the character string to be displayed at a reference speed in a case where the character string is judged as a character string easy to read by the reading difficulty judging unit, and setting the scroll speed of the character string to be displayed at a slower speed than the reference speed in a case where the character string is judged as a character string difficult to read by the reading difficulty judging unit, and a character string display unit for, when decision is made by the display format deciding unit that the display format of the character string is telop display, telop-displaying the character string to be displayed at the scroll speed set by the scroll speed setting unit, and when decision is made by the display format deciding unit that the display format of the character string is full text simultaneous display, simultaneously displaying all the characters making up the character string to be displayed on a screen, wherein when the characters making up the character string to be displayed are ideographic characters, the character attribute determining unit identifies a difficulty indicative of the degree of difficulty in pronunciation of the character string as the attribute of the characters, and the reading difficulty judging unit judges the character string to be displayed as a character string easy to read in a case where the difficulty identified by the character attribute determining unit is lower than a prescribed difficulty, and judges the character string to be displayed as a character string difficult to read in a case where the difficulty identified by the character attribute determining unit is higher than the prescribed difficulty.

2. A character information display device, comprising:

a display format deciding unit for deciding that, based on a length of a character string to be displayed, a display format of the character string to be displayed is telop display or full text simultaneous display, a character attribute determining unit for determining attributes of characters making up the character string to be displayed, a reading difficulty judging unit for judging whether the character string to be displayed is a character string easy to read, or a character string difficult to read based on the attributes of the characters determined by the character attribute determining unit, a scroll speed setting unit for, when decision is made by the display format deciding unit that the display format of the character string is telop display, setting a scroll speed of the character string to be displayed at a reference speed in a case where the character string to be displayed is judged as a character string easy to read by the reading difficulty judging unit, and setting the scroll speed of the character string to be displayed at a slower speed than the reference speed in a case where the character string to be displayed is judged as a character string difficult to read by the reading difficulty judging unit, and a character string display unit for, when decision is made by the display format deciding unit that the display format of the character string is telop display, telop-displaying the character string to be displayed at the scroll speed set by the scroll speed setting unit, and when decision is made by the display format deciding unit that the display format of the character string is full text simultaneous display, simultaneously displaying all the characters making up the character string to be displayed on a screen, and further comprising: a visual range detecting unit for, when the character string is displayed on screens of a plurality of indicators, detecting a user's visual range with respect to the indicators, wherein when the display format of the character string is decided as telop display by the display format deciding unit, the character string display unit telop-displays the character string to be displayed on each of the screens of the plurality of indicators in a case where the user's visual range detected by the visual range detecting unit is shorter than a reference distance, and with the screens of the plurality of indicators as one large screen, telop-displays the character string to be displayed on the large screen in a case where the user's visual range detected by the visual range detecting unit is longer than the reference distance.

3. The character information display device according to claim 1, further comprising:

a display time setting unit for, when decision is made by the display format deciding unit that the display format of the character string is full text simultaneous display, setting a display time of the character string to be displayed at a reference display time in a case where the character string to be displayed is judged as a character string easy to read by the reading difficulty judging unit, and setting the display time of the character string to be displayed at a longer time than the reference display time in a case where the character string to be displayed is judged as a character string difficult to read by the reading difficulty judging unit, wherein when decision is made by the display format deciding unit that the display format of the character string is full text simultaneous display, the character string display unit displays the character string to be displayed during the display time set by the display time setting unit.

4. The character information display device according to claim 1, wherein when the characters making up the character string to be displayed are ideographic characters, the character attribute determining unit identifies each stroke count of the characters making up the character string as the attribute of the characters, and the reading difficulty judging unit judges the character string to be displayed as a character string easy to read in a case where the characters making up the character string to be displayed do not include therein a character whose stroke count identified by the character attribute determining unit exceeds a prescribed stroke count, and judges the character string to be displayed as a character string difficult to read in a case where the characters making up the character string to be displayed include therein a character whose stroke count identified by the character attribute determining unit exceeds the prescribed stroke count.

5. The character information display device according to claim 1, wherein when the characters making up the character string to be displayed are ideographic characters, the character attribute determining unit identifies a total stroke count of all the characters making up the character string as the attribute of the characters, and the reading difficulty judging unit judges the character string to be displayed as a character string easy to read in a case where the total stroke count identified by the character attribute determining unit does not exceed a prescribed total stroke count, and judges the character string to be displayed as a character string difficult to read in a case where the total stroke count identified by the character attribute determining unit exceeds the prescribed stroke count.

6. The character information display device according to claim 1, wherein when the characters making up the character string to be displayed are ideographic characters, the character attribute determining unit identifies each stroke count of the characters making up the character string, and identifies the total stroke count of all the characters making up the character string as the attributes of the characters, and the reading difficulty judging unit judges the character string to be displayed as a character string easy to read in a case where the characters making up the character string to be displayed do not include a character whose stroke count identified by the character attribute determining unit exceeds a prescribed stroke count, and in a case where the total stroke count identified by the character attribute determining unit does not exceed a prescribed total stroke count, and judges the character string to be displayed as a character string difficult to read in a case where the characters making up the character string to be displayed include therein a character whose stroke count identified by the character attribute determining unit exceeds the prescribed stroke count, or in a case where the total stroke count identified by the character attribute determining unit exceeds the prescribed total stroke count.

7. The character information display device according to claim 1, wherein when the characters making up the character string to be displayed are ideographic characters, the character attribute determining unit identifies each familiarity indicative of the degree of approachability to the characters making up the character string as the attribute of the characters, and the reading difficulty judging unit judges the character string to be displayed as a character string easy to read in a case where the characters making up the character string to be displayed do not include therein a character whose familiarity identified by the character attribute determining unit is lower than a prescribed familiarity, and judges the character string to be displayed as a character string difficult to read in a case where the characters making up the character string to be displayed include therein a character whose familiarity identified by the character attribute determining unit is lower than the prescribed familiarity.

8. The character information display device according to claim 1, wherein when the characters making up the character string to be displayed are ideographic characters, the character attribute determining unit identifies the number of the characters making up the character string as the attribute of the characters, and the reading difficulty judging unit judges the character string to be displayed as a character string easy to read in a case where the number identified by the character attribute determining unit is smaller than a prescribed number, and judges the character string to be displayed as a character string difficult to read in a case where the number identified by the character attribute determining unit is larger than the prescribed number.

9. The character information display device according to claim 1, wherein when the characters making up the character string to be displayed are ideographic characters, the character attribute determining unit identifies a familiarity indicative of the degree of approachability to the character string as the attribute of the characters, and the reading difficulty judging unit judges the character string to be displayed as a character string easy to read in a case where the familiarity identified by the character attribute determining unit is higher than a prescribed familiarity, and judges the character string to be displayed as a character string difficult to read in a case where the familiarity identified by the character attribute determining unit is lower than the prescribed familiarity.

10. The character information display device according to claim 1, wherein when the characters making up the character string to be displayed are ideographic characters, the character attribute determining unit identifies the number of the characters forming the character string, and identifies a familiarity indicative of the degree of approachability to the character string as the attributes of the characters, and the reading difficulty judging unit judges the character string to be displayed as a character string easy to read in a case where the number identified by the character attribute determining unit is smaller than a prescribed number and the familiarity identified by the character attribute determining unit is higher than a prescribed familiarity, and judges the character string to be displayed as a character string difficult to read in a case where the number identified by the character attribute determining unit is larger than the prescribed number, or in a case where the familiarity identified by the character attribute determining unit is lower than the prescribed familiarity.

11. The character information display device according to claim 1, wherein when the characters making up the character string to be displayed are ideographic characters, the character attribute determining unit identifies a visual complexity with respect to the character string as the attribute of the characters, and the reading difficulty judging unit judges the character string to be displayed as a character string easy to read in a case where the complexity identified by the character attribute determining unit is lower than a prescribed complexity, and judges the character string to be displayed as a character string difficult to read in a case where the complexity identified by the character attribute determining unit is higher than the prescribed complexity.

12. The character information display device according to claim 1, wherein when the characters making up the character string to be displayed are ideographic characters, the character attribute determining unit identifies the number of the characters making up the character string, and identifies a visual complexity with respect to the character string as the attributes of the characters, and the reading difficulty judging unit judges the character string to be displayed as a character string easy to read in a case where the number identified by the character attribute determining unit is smaller than a prescribed number and the complexity identified by the character attribute determining unit is lower than a prescribed complexity, and judges the character string to be displayed as a character string difficult to read in a case where the number identified by the character attribute determining unit is larger than the prescribed number, or in a case where the complexity identified by the character attribute determining unit is higher than the prescribed complexity.

13. The character information display device according to claim 1, further comprising:

an importance determining unit for determining an importance of the character string to be displayed with reference to importance information added to the character string to be displayed, wherein when decision is made by the display format deciding unit that the display format of the character string is telop display, the character string display unit telop-displays the character string by a display method corresponding to the importance determined by the importance determining unit.

14. The character information display device according to claim 13, wherein when the importance determined by the importance determining unit is at the highest rank, the character string display unit stops telop display, and displays the character string to be displayed on the whole screen.

15. The character information display device according to claim 13, wherein the character string display unit changes a region on the screen on which the character string is telop-displayed according to the importance determined by the importance determining unit.

16. A character information display method, comprising:

a display format decision processing step in which decision is made by a display format deciding unit that a display format of a character string to be displayed is telop display or full text simultaneous display based on a length of the character string to be displayed;

a character attribute determination processing step in which a character attribute determining unit determines attributes of characters making up the character string to be displayed;

a reading difficulty judgment processing step in which a reading difficulty judging unit judges whether the character string to be displayed is a character string easy to read or a character string difficult to read based on the attributes of the characters determined in the character attribute determination processing step, a scroll speed setting processing step in which, when decision is made in the display format decision processing step that the display format of the character string is telop display, a scroll speed setting unit sets the scroll speed of the character string to be displayed at a reference speed in a case where the character string to be displayed is judged as a character string easy to read in the reading difficulty judgment processing step, and sets the scroll speed of the character string to be displayed at a slower speed than the reference speed in a case where the character string to be displayed is judged as a character string difficult to read in the reading difficulty judgment processing step, and a character string display processing step in which a character string display unit telop-displays the character string to be displayed at the scroll speed set in the scroll speed setting processing step when decision is made in the display format decision processing step that the display format of the character string is telop display, and simultaneously displays all the characters making up the character string to be displayed on a screen when decision is made in the display format decision processing step that the display format of the character string is full text simultaneous display, wherein when the characters making up the character string to be displayed are ideographic characters, the character attribute determining step identifies a difficulty indicative of the degree of difficulty in pronunciation of the character string as the attribute of the characters, and the reading difficulty judging step judges the character string to be displayed as a character string easy to read in a case where the difficulty identified by the character attribute determining unit is lower than a prescribed difficulty, and judges the character string to be displayed as a character string difficult to read in a case where the difficulty identified by the character attribute determining unit is higher than the prescribed difficulty.

17. A character information display method, comprising:

a display format decision processing step in which decision is made that a display format of a character string to be displayed is telop display or full text simultaneous display based on a length of the character string to be displayed;

a character attribute determination processing step of determining attributes of characters making up the character string to be displayed;

a reading difficulty judgment processing step of judging whether the character string to be displayed is a character string easy to read or a character string difficult to read based on the attributes of the characters determined in the character attribute determination processing step, a scroll speed setting processing step of, when decision is made in the display format decision processing step that the display format of the character string is telop display, setting the scroll speed of the character string to be displayed at a reference speed in a case where the character string to be displayed is judged as a character string easy to read in the reading difficulty judgment processing step, and setting the scroll speed of the character string to be displayed at a slower speed than the reference speed in a case where the character string to be displayed is judged as a character string difficult to read in the reading difficulty judgment processing step, and a character string display processing step of telop-displaying the character string to be displayed at the scroll speed set in the scroll speed setting processing step when decision is made in the display format decision processing step that the display format of the character string is telop display, and simultaneously displaying all the characters making up the character string to be displayed on a screen when decision is made in the display format decision processing step that the display format of the character string is full text simultaneous display, and further comprising: a visual range detecting step of, when the character string is displayed on screens of a plurality of indicators, detecting a user's visual range with respect to the indicators, wherein when decision is made that the display format of the character string is telop display by the display format deciding step, the character string display step telop-displays the character string to be displayed on each of the screens of the plurality of indicators in a case where the user's visual range detected by the visual range detecting step is shorter than a reference distance, and with the screens of the plurality of indicators as one large screen, telop-displays the character string to be displayed on the large screen in a case where the user's visual range detected by the visual range detecting step is longer than the reference distance.

* * * * *